(12) United States Patent
Chase et al.

(10) Patent No.: US 9,631,759 B2
(45) Date of Patent: Apr. 25, 2017

(54) EXPANSION JOINT FOR PIPELINES

(75) Inventors: Randy L. Chase, Bethlehem, PA (US); Douglas R. Dole, Whitehouse Station, NJ (US); Lawrence W. Thau, Jr., Flemington, NJ (US); Wayne M. Biery, Center Valley, PA (US); Scott D. Madara, Nazareth, PA (US); Ryan D. Kuehner, Kunkletown, PA (US)

(73) Assignee: Victaulic Company, Easton, PA (US)

( * ) Notice: Subject to any disclaimer, the term of this patent is extended or adjusted under 35 U.S.C. 154(b) by 0 days.

(21) Appl. No.: 13/591,310

(22) Filed: Aug. 22, 2012

(65) Prior Publication Data

US 2013/0049354 A1 Feb. 28, 2013

Related U.S. Application Data

(60) Provisional application No. 61/588,429, filed on Jan. 19, 2012, provisional application No. 61/540,676, filed on Sep. 29, 2011, provisional application No. 61/525,987, filed on Aug. 22, 2011.

(51) Int. Cl.
  *F16L 51/00* (2006.01)
  *F16L 21/04* (2006.01)
  *F16L 27/12* (2006.01)

(52) U.S. Cl.
  CPC .............. *F16L 51/00* (2013.01); *F16L 21/04* (2013.01); *F16L 27/12* (2013.01)

(58) Field of Classification Search
  CPC ............ F16L 27/12; F16L 27/04; F16L 51/00
  USPC ....... 285/298, 302, 244, 231, 232, 342, 343, 285/367, 339, 411
  See application file for complete search history.

(56) References Cited

U.S. PATENT DOCUMENTS

| | | | | |
|---|---|---|---|---|
| 643,802 | A | * | 2/1900 | Morison ......................... 285/302 |
| 686,598 | A | * | 11/1901 | Evans ............................ 277/621 |
| 1,824,422 | A | * | 9/1931 | Badger ......................... 285/302 |
| 1,872,089 | A | | 8/1932 | McKee |
| 2,028,182 | A | * | 1/1936 | Barnickol, Jr. ............... 285/112 |
| 2,308,757 | A | | 1/1943 | Ernst |
| 2,319,543 | A | | 5/1943 | Hall |
| 2,323,179 | A | | 6/1943 | Hall |
| 2,422,502 | A | | 6/1947 | Schrader |

(Continued)

FOREIGN PATENT DOCUMENTS

| | | |
|---|---|---|
| DE | 2162903 | 12/1971 |
| JP | 62075190 A | 4/1987 |

(Continued)

OTHER PUBLICATIONS

Henning, Mobius; European Search Report from corresponding European patent application No. 1284981; Nov. 28, 2014; pp. 1-3; European Patent Office, Munich, Germany.

(Continued)

*Primary Examiner* — David E Sosnowski
*Assistant Examiner* — James A Linford
(74) *Attorney, Agent, or Firm* — Ballard Spahr LLP

(57) ABSTRACT

A tube is surrounded by a ring attached to a sleeve. One end of the tube is attached to a pipe of the pipeline, one end of the sleeve is attached to another pipe of the pipe line. The tube and the ring and sleeve are movable axially relatively to one another when the pipe line expands or contracts linearly. A seal between the ring and the tube ensures fluid tightness of the joint.

29 Claims, 15 Drawing Sheets

(56) References Cited

U.S. PATENT DOCUMENTS

| | | | |
|---|---|---|---|
| 2,545,701 A | | 3/1951 | McCausland |
| 3,455,582 A | | 7/1969 | Hoevel |
| 3,938,832 A | * | 2/1976 | Preston .................. 285/135.2 |
| 3,984,131 A | | 10/1976 | Gingrich, Jr. et al. |
| 4,030,740 A | | 6/1977 | Kniss, Jr. et al. |
| 4,106,798 A | | 8/1978 | Haug |
| 4,146,253 A | | 3/1979 | Celommi |
| 4,225,143 A | | 9/1980 | Hannah |
| 4,274,663 A | | 6/1981 | Becker et al. |
| 4,284,280 A | | 8/1981 | Bertram et al. |
| 4,512,410 A | | 4/1985 | Forester |
| 4,569,539 A | | 2/1986 | Creedon |
| 4,640,533 A | * | 2/1987 | Klemm ................ F16L 27/12 137/615 |
| 5,094,795 A | * | 3/1992 | McMillan et al. ........... 264/248 |
| 2,438,312 A | | 5/1992 | Bunn et al. |
| 5,116,085 A | | 5/1992 | Carrel |
| 5,131,666 A | | 7/1992 | Hutchens |
| 5,282,654 A | | 2/1994 | Hendrickson |
| 5,421,621 A | | 6/1995 | Schaefer |
| 5,433,482 A | * | 7/1995 | Baddour ...................... 285/31 |
| 5,746,453 A | | 5/1998 | Roberts |
| 5,879,010 A | | 3/1999 | Nilkanth et al. |
| 6,131,960 A | | 10/2000 | McHughs |
| 6,494,503 B1 | | 12/2002 | Heubach et al. |
| 6,763,892 B2 | | 7/2004 | Kaszuba |
| 7,316,423 B2 | | 1/2008 | Rochelle |
| 2004/0164554 A1 | * | 8/2004 | Cabezas ..................... 285/405 |
| 2005/0253380 A1 | * | 11/2005 | Gibb et al. .................. 285/111 |
| 2008/0129048 A1 | | 6/2008 | Nagle et al. |
| 2009/0096207 A1 | | 4/2009 | Argersinger |
| 2010/0289262 A1 | | 11/2010 | Kobayashi |

FOREIGN PATENT DOCUMENTS

| | | | | |
|---|---|---|---|---|
| JP | 03153987 A | * | 7/1991 | |
| JP | 04034288 A | * | 2/1992 | ............. F16L 27/12 |
| JP | 2000154894 A | | 6/2000 | |
| TW | 573717 | | 1/2004 | |
| TW | I336381 | | 1/2011 | |

OTHER PUBLICATIONS

Henning, Mobius; European Search Opinion from corresponding European patent application No. 1284981; Nov. 28, 2014; pp. 1-3; European Patent Office, Munich, Germany.

(Copenheaver, Blaine R.) PCT International Search Report and Written Opinion regarding International Application No. PCT/US2012/051294, Nov. 2, 2012.

(Author Unknown)—U.S.Bellows, Inc. "Expansion Joint Brochure" (online); Retrieved on Nov. 8, 2012 from the internet at http://web.archive.org/web/2008/230100058/http://www.usbellows.com/PDF_Files/usbellows.pdf.

Author Unknown; Translation of Search Report from corresponding Taiwan patent application No. 101130512; issued May 13, 2015; 1 Page; ROC (Taiwan) Intellectual Property Office.

Gollain, Lud; Office Action from related Canadian patent application No. 2,787,799, Oct. 28, 2015, pp. 1-5, aanadian Intellectual Property Office.

O'Brien, Conor, Office Action from counterpart Australian patent application No. 2012299165, Jun. 30, 2016, pp. 1-4, Australian Patent Office, Philip, Australian Capital Territory, Australia.

Author Unknown, English translation of Decision of Rejection from counterpart Chinese patent application No. 201280040920.5, Jul. 18, 2016, pp. 1-11, translation prepared by China Patent Agent; 22/F, Great Eagle Center, 23 Harbour Road, Wanchai, Hong Kong.

Author Unknown, Third Office Action from counterpart Chinese patent application No. 201280040920.5, Jan. 19, 2016, pp. 1-4; State Intellectual Property Office, P.R. China.

Author Unknown, English translation of Third Office Action from counterpart Chinese patent application No. 201280040920.5; Jan. 19, 2016, pp. 1-6; prepared by China Patent Agent (H.K.) Ltd, Wanchai, Hong Kong.

Watanabe, Hiroshi, Office Action from counterpart Japanese patent application No. 2014-527194, May 6, 2016, pp. 1-8, Japanese Patent Office, Tokyo, Japan.

Watanabe, Hiroshi, English translation of Office Action from counterpart Japanese patent application No. 2014-527194, May 6, 2016, pp. 1-13, prepared by Shusaku Yamamoto, Patent Attorneys, Osaka, Japan.

\* cited by examiner

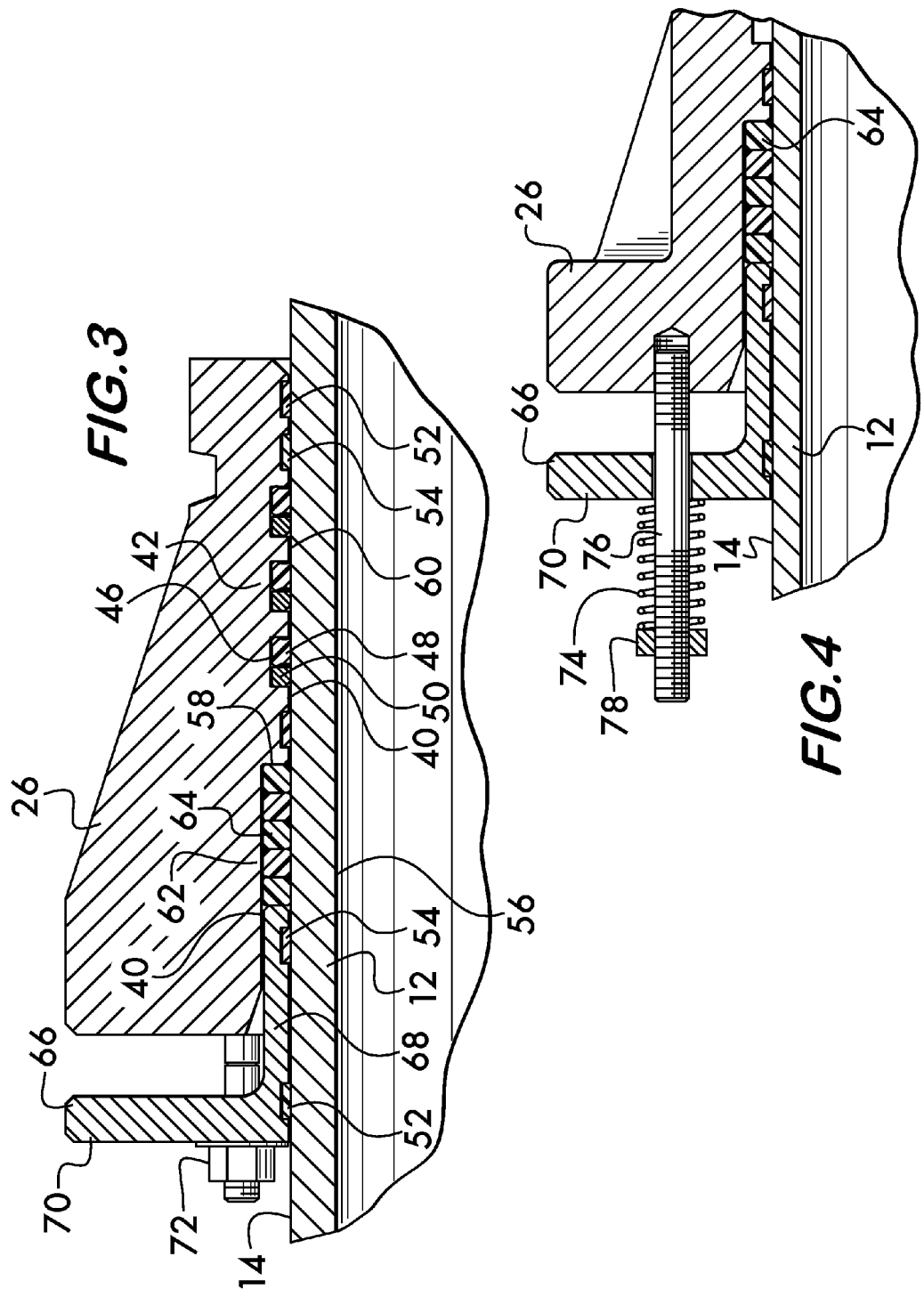

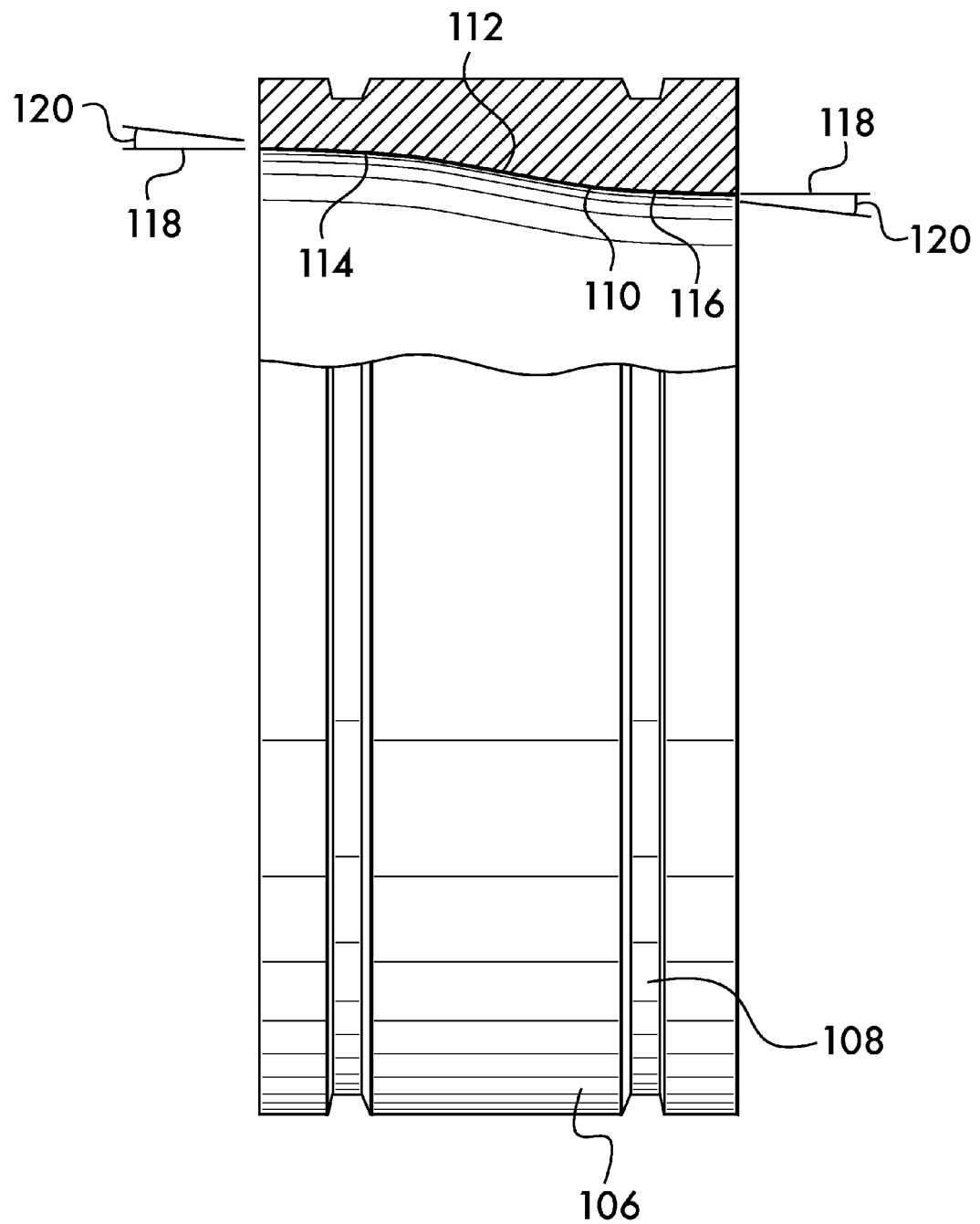

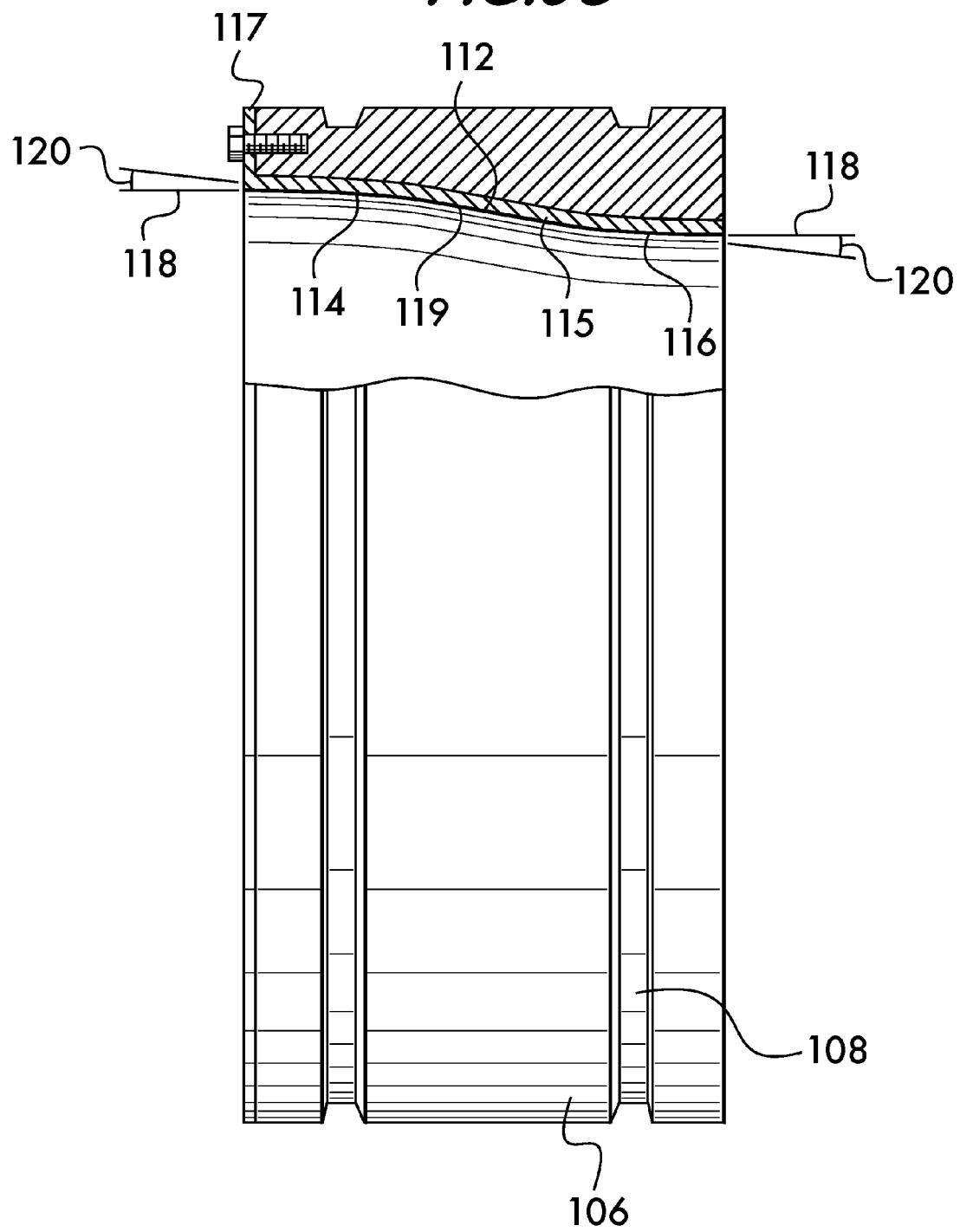

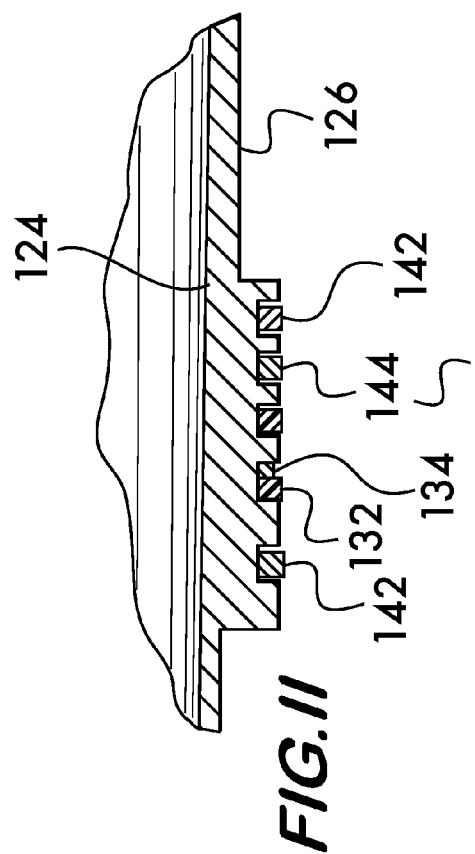
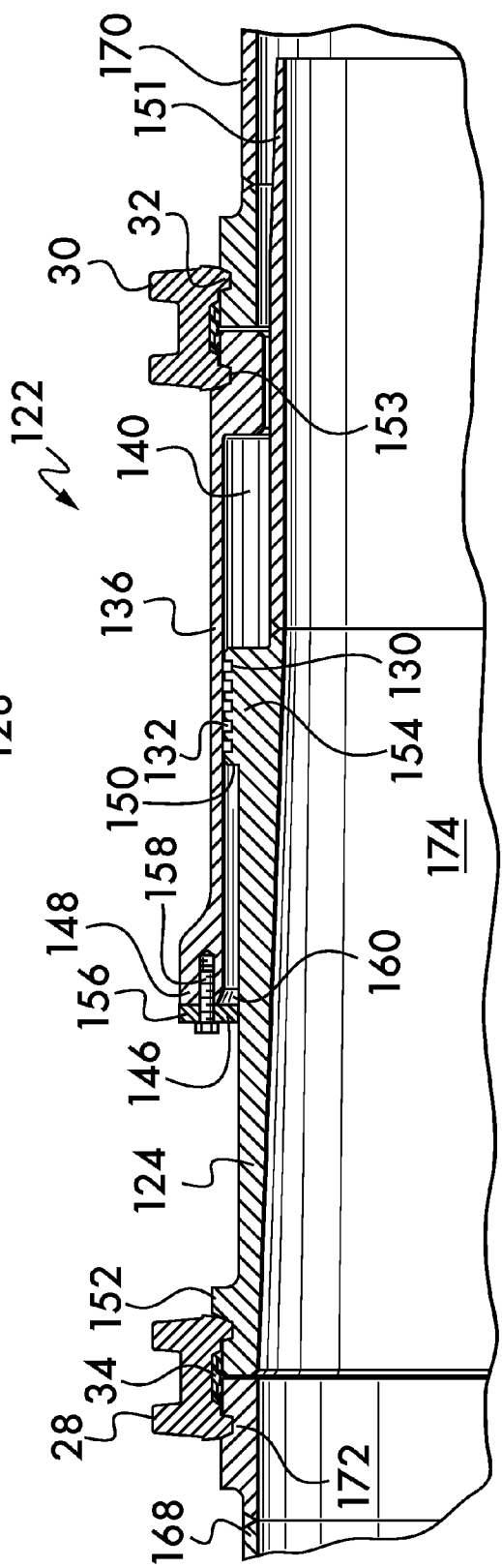

EXPANSION JOINT FOR PIPELINES

CROSS REFERENCE TO RELATED APPLICATIONS

This application claims priority to: U.S. Provisional Patent Application No. 61/525,987, filed Aug. 22, 2011; U.S. Provisional Patent Application No. 61/540,676, filed Sep. 29, 2011; and U.S. Provisional Patent Application No. 61/588,429, filed Jan. 19, 2012, all of these Provisional Patent Applications being incorporated by reference in their entirety.

FIELD OF THE INVENTION

This invention concerns expansion joints used in long pipe lines subjected to thermally induced expansion and contraction.

BACKGROUND

Pipe lines used in industries, such as petroleum extraction, may be long and exposed to alternating cycles of heating and cooling. This is of particular concern for above-ground pipe lines, which are subjected to larger temperature variation than below ground lines. The heating and cooling may be the result of large variations in ambient temperature, both daily and seasonal, to which the pipe line is exposed, as well as due to the heat contained in the fluid being pumped through the pipe line. The fluid itself may be hot, or may be heated by pumping action. Friction between the fluid and pipe line may also contribute to the heating and expansion.

As is well known, many materials, especially metals such as steel from which pipe lines are often constructed, expand and contract in response to heating and cooling. The coefficient of linear expansion of the material is the characteristic which quantitatively describes how an elongate item, such as a pipe element, will behave in response to heating and cooling. The units of the coefficient of linear expansion, specified in English units of measure, are inches of expansion per inch of pipe per temperature change in degrees Fahrenheit. It is thus clear that expansion or contraction of a pipe line will be directly proportional to both the change in temperature as well as the length of the pipe line.

For long pipe lines subjected to even small ambient or internal temperature variations it is advantageous to provide expansion joints at intervals along the length of the pipe line to accommodate the thermally induced changes in length and prevent damage to the pipe line which might otherwise occur. For example, the pipe line may buckle when subjected to compression due to expansion in response to an increase in temperature, or, a joint may fail when subjected to tension loads due to pipe line contraction in response to a decrease in temperature.

SUMMARY

The invention concerns an expansion joint for connecting pipe elements. In one embodiment, the expansion joint comprises a tube having an outer surface and first and second ends oppositely disposed. A sleeve has first and second ends oppositely disposed, the sleeve being positioned surrounding at least a portion of the tube. The portion includes the second end of the tube. A ring, separate from the sleeve and removably attachable to the first end thereof, surrounds the tube and has an inner surface facing the outer surface of the tube. A coupling is positioned between the ring and the first end of the sleeve. The coupling removably attaches the ring to the sleeve. A seal is mounted on the inner surface of the ring and sealingly engages the outer surface of the tube. The ring and the sleeve are slidably movable axially relatively to the tube.

In a particular example embodiment, the first end of the tube has an outwardly facing surface with a circumferential groove therein. The coupling may have a plurality of arcuate segments joined end to end surrounding the tube. In this example, each of the segments has first and second radially inwardly projecting keys positioned in spaced apart relation and the ring has an outwardly facing surface with a circumferential groove therein. The sleeve has an outwardly facing surface positioned at the first end thereof with a circumferential groove therein. The first key engages the circumferential groove in the ring, the second key engages the circumferential groove in the sleeve.

In a further example embodiment, the sleeve has an outwardly facing surface positioned at the second end thereof with a circumferential groove therein.

In a particular embodiment, the seal comprises at least one inwardly facing circumferential groove positioned in the inner surface of the ring with a sealing element positioned within the at least one groove. For example, the sealing element may comprise an O-ring. Additionally, an anti-extrusion ring positioned within the at least one groove. In another example, the seal comprises a plurality of inwardly facing circumferential grooves positioned in the inner surface of the ring and a plurality of sealing elements, each positioned within a respective one of the grooves. In this example the sealing elements may comprise O-rings. Additionally, a plurality of anti-extrusion rings may each be positioned within a respective one of the grooves.

In another example embodiment, the expansion joint may comprise at least one inwardly facing circumferential groove positioned in the inner surface of the ring and at least one bearing element positioned within the at least one groove. Additionally, the expansion joint may also include at least one inwardly facing circumferential groove positioned in the inner surface of the ring and at least one wiper element positioned within the at least one groove.

In another example embodiment, the seal comprises a shoulder projecting radially inwardly from the inner surface of the ring. Packing material surrounds the tube and is positioned adjacent to the shoulder between the inner surface of the ring and the outer surface of the tube. A hoop is attached to the ring and surrounds the tube. The hoop is positioned adjacent to the packing material and the packing material is captured between the hoop and the shoulder. In this example the hoop is axially movable relatively to the ring for compressing the packing material against the shoulder. To effect motion of the hoop the expansion joint comprises a plurality of adjustable fasteners. Each fastener extends between the hoop and the ring wherein tightening of the fasteners moves the hoop toward the ring for compressing the packing material.

An example embodiment of the expansion joint may further comprise a plurality of springs. Each one of the springs is mounted on one of the fasteners and engages the hoop for biasing the hoop toward the ring, thereby compressing the packing material.

In another example embodiment, the expansion joint further comprises an inlet segment positioned at the first end of the tube. The inlet segment has a conical inner surface. The conical inner surface may be selected from the group consisting of a straight taper and an s-shaped taper having an inflection point marking the transition between a concave inner surface and a convex inner surface. In this example embodiment the inlet segment may be separate from the first end of the tube and removably attached thereto. The inlet segment has first and second ends oppositely disposed. A second coupling may be positioned between the first end of the tube and the first end of the inlet segment, the second coupling removably attaching the inlet segment to the tube. By way of example, the second coupling has a plurality of arcuate segments joined end to end surrounding the tube. Each of the segments has first and second radially inwardly projecting keys positioned in spaced apart relation. The first end of the tube has an outwardly facing surface with a circumferential groove therein. The first end of the inlet segment has an outwardly facing surface with a circumferential groove therein. The first key engages the circumferential groove in the tube, the second key engaging the circumferential groove in the inlet segment.

In another example embodiment, the expansion joint comprises a first lug projecting outwardly from the outer surface of the tube and a second lug projecting outwardly from an outer surface of the ring. A rod is attached to one of the lugs and extends though an opening in another of the lugs. The rod guides and is an indicator of relative motion between the tube and the ring. In a particular example the rod is attached to the first lug. The rod may comprise a projection extending radially outwardly therefrom. The projection is engageable with the second lug to limit relative motion between the tube and the ring. An actuator may be positioned between the first and second lugs. The actuator applies force to the lugs to move the ring and the tube relatively to one another. For example, the actuator may comprises a hydraulic actuator.

In another example embodiment of an expansion joint for connecting pipe elements, the expansion joint comprises a tube having an outer surface and first and second ends oppositely disposed. A sleeve is positioned surrounding at least a portion of the tube. The sleeve has an inner surface facing the outer surface of the tube. The sleeve and the tube are slidably movable lengthwise relatively to one another. A seal is positioned between the outer surface of the tube and the inner surface of the sleeve. A first surface projects transversely from the outer surface of the tube, the first surface being positioned between the first end of the tube and the seal. A second surface projects transversely from the inner surface of sleeve toward the tube and is engageable with the first surface to limit relative sliding motion between the tube and the sleeve when the first and second surfaces contact one another. In a particular example embodiment, the sleeve has a length less than the length of the tube. Additionally, the second end of the tube may project axially outwardly from the sleeve.

BRIEF DESCRIPTION OF THE DRAWINGS

FIG. 3 is a sectional view of a portion of the expansion joint of FIG. 1;

FIG. 4 is a sectional view of a portion of an example embodiment of an expansion joint;

FIGS. 9, 9A, 9B and 9C are a partial sectional views of example inlet segments useable with an expansion joint;

FIG. 11 is a sectional view of a portion of the expansion joint of FIG. 10;

FIG. 13 is a partial sectional view of an example expansion joint in a pipeline.

DETAILED DESCRIPTION

Figure 1:
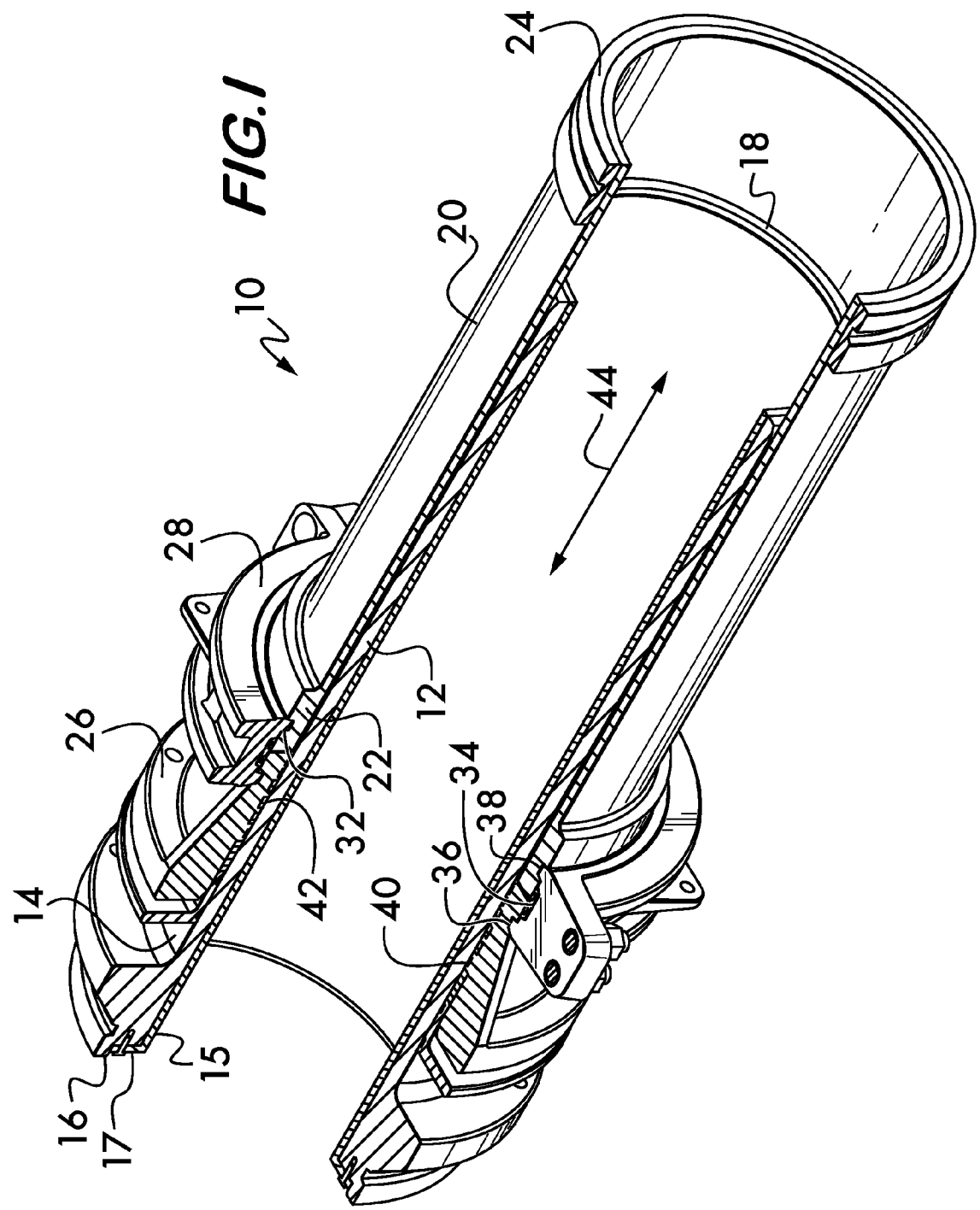
FIG. 1 is a partial sectional isometric view of an example expansion joint.

FIG. 1 illustrates an example expansion joint 10 according to the invention. Expansion joint 10 comprises a tube 12 having an outer surface 14 and first and second ends 16 and 18 oppositely disposed. It may be advantageous to position an abrasion resistant liner 15 within the tube 12. Liner 15 may comprise for example, hardened steel, or have a chromium carbide overlay, or comprise a ceramic which is abrasion resistant. As the liner 15 provides a sacrificial surface (preventing wear of the tube 12) it is further advantageous that the liner 15 be easily removable from the tube to allow ready replacement of spent liners. To facilitate removability, the liner 15 may have a flange 17 which is bolted to the end 16 of the tube 12.

Figure 2:
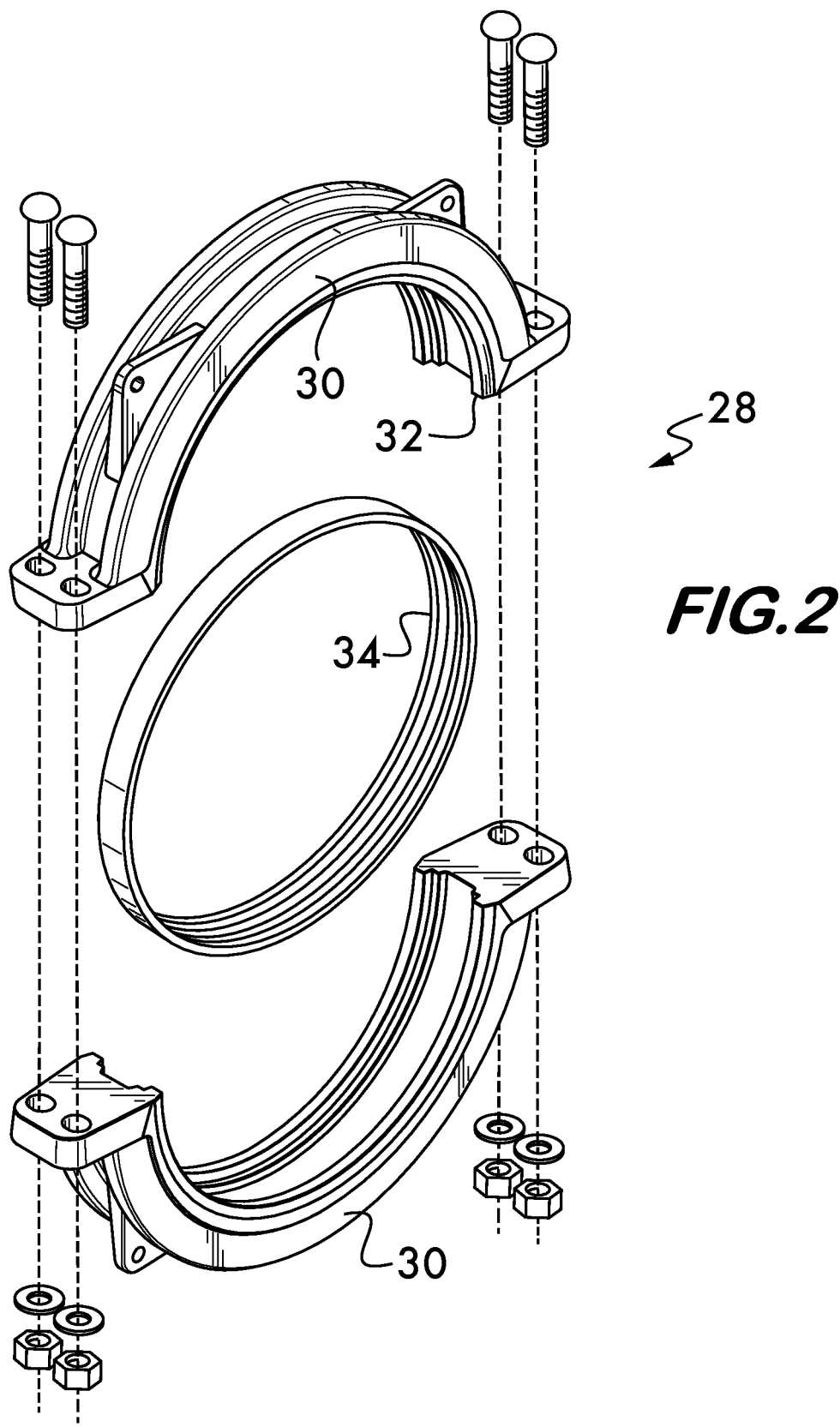
FIG. 2 is an exploded isometric view of an example mechanical coupling.

A sleeve 20 surrounds at least a portion of the tube 12 which includes the second end 18. Sleeve 20 has respective first and second ends 22 and 24, oppositely disposed. A ring 26 is attached to sleeve 20. Ring 26 is separate from sleeve 20 and is removably attached to the first end 22 of the sleeve. In this example, attachment of the ring and sleeve is effected using a segmented mechanical coupling 28. FIG. 2 shows an exploded view of coupling 28, which includes arcuate segments 30 having pairs of keys 32 in spaced apart relation. A gasket seal 34 is positioned between the keys 32 when the segments 30 are bolted end to end surrounding and joining the ring 26 to the sleeve 20. As shown in FIG. 1, the keys 32 engage a circumferential groove 36 in the outer surface of the ring 26 and a groove 38 in the outer surface of the first end 22 of sleeve 20. Engagement between the keys 32 and grooves 36 and 38 provide positive mechanical engagement between the ring 26 and the sleeve 20, and the gasket 34 ensures a fluid tight seal at the joint. Other types of mechanical couplings, for example, interfacing bolted flanges positioned on ring 26 and sleeve 20, are also feasible.

Ring 26 surrounds tube 12 and is positioned between the tube's first and second ends 16 and 18. Ring 26 has an inner surface 40 facing the outer surface 14 of tube 12. A seal 42 is mounted on the inner surface 40 of ring 26. Seal 42 sealingly engages the outer surface 14 of the tube 12. The ring 26 and sleeve 20 are slidably movable axially relatively to tube 12, the axial direction being shown by the double-headed arrow 44. The outer surface 14 of tube 12 is smooth and facilitates the formation of a fluid tight seal between the seal 42 and tube 12. The smooth surface also allows the tube 12 and the ring 26 (along with sleeve 20) to slide axially relatively to one another while maintaining the seal.

In this example, as shown in FIG. 3, seal 42 comprises a plurality of circumferential grooves 46 positioned in the inner surface 40 of the ring 26. One or more of the grooves 46 receives a sealing element 48, such as an O-ring. Other types of sealing elements, such as quad rings and engineered lip seals are also feasible. In addition to the sealing elements, anti-extrusion rings 50 may also be positioned within the grooves 46 adjacent to each sealing element 48. Anti-extrusion rings 50 are installed within grooves 46 on the low pressure side of the sealing elements 48 and help prevent extrusion of the sealing elements into the gap between the ring 26 and the tube 12. Sealing elements and the anti-extrusion rings may be made of compliant materials such as EPDM, nitrile and other natural and synthetic rubber compounds, as well as other polymers such as PTFE, nylon, polyurethane and PEEK. It is advantageous to use form the anti-extrusion rings from elastomers so that they can accommodate the significant changes in diameter of the tube 12 due to thermal effects.

It is further advantageous to position other functional elements in grooves 46. For example, one or more wiper elements 52, comprising, for example, quad rings formed of plastic such as PTFE, may be placed in one or more of the grooves 46. Wiper elements serve to clean the outer surface 14 of tube 12 of foreign matter which might otherwise damage the sealing elements 48. This is especially useful when the expansion joint is carrying abrasive slurries, which may work their way into the gap between the tube 12 and the sleeve 20 to which the ring 26 is attached, and thereby contaminate the tube outer surface 14. Additionally, bearing elements 54, for example, rings formed of plastic such as PTFE or fiber reinforced composites formed of graphite, may also be positioned within grooves 46 to support and guide the ring 26 and tube 12 during relative motion between the two components.

In the example embodiment shown in FIG. 3, a shoulder 58 is positioned adjacent to the seal 42 and projects inwardly from the inner surface 40 of the ring 26 toward the outer surface 14 of tube 12. It is practical to make the shoulder 58 integral with the inner surface 40 of ring 26 and have it be part of a raised grooved surface 60 which receives the sealing elements 48, wipers 52, bearings 54 and other interface components between the ring 26 and tube 12. Shoulder 58 permits another seal 62 to be part of ring 26. Seal 62 may be used alone as the primary seal between the ring 26 and the tube 12, or, it may be considered a back-up seal to seal 42. Seal 62 is formed by a packing material 64 positioned surrounding the tube 12, the packing material being positioned adjacent to the shoulder 58 and between a portion of the inner surface 40 of the ring 26 and the outer surface 14 of the tube 12. Packing material 64 may be formed, for example, of braided graphite, with or without PTFE filler. The packing 64 is initially compressed to effect a fluid tight seal. To ensure a fluid tight seal with packing wear and pressure variation, the packing may be compressed further. A compression hoop 66 is provided for this function. Compression hoop 66 is attached to ring 26 adjacent to the packing material 64 and surrounds tube 12. Hoop 66 has an angle cross section, with one leg 68 of the angle being positioned between the outer surface 14 of tube 12 and the inner surface 40 of ring 26 so as to contact packing material 64. The other leg 70 of the compression hoop 66 extends radially outwardly from the leg 68. Hoop 66 is movable axially toward and away from the packing material 64 so as to adjust the bulging caused by packing compression and thus effect a seal. Motion of the compression hoop 66 is effected by a plurality of adjustable fasteners such as threaded studs and nuts 72, which pass through leg 70 and are threadedly engaged with the end of ring 26. The studs and nuts 72 are distributed circumferentially around the hoop 66, preferably at equal intervals, fairly closely spaced. This permits uniform compression to be applied to the packing by tightening the nuts 72. Note that additional wiper elements 52 and/or bearing elements 54 may be mounted in leg 68 of hoop 66 to support the ring 26 on its moving interface with surface 14 of tube 12. The advantage of having a compressible back-up seal such as seal 62 is manifest, for example, when seal 42 begins to leak. Unlike seal 62, seal 42 is not adjustable and must be repaired. However, if seal 62 begins to leak it can be further compressed as described above, stopping any leakage and buying time for replacement of the seal 42.

Figure 5:
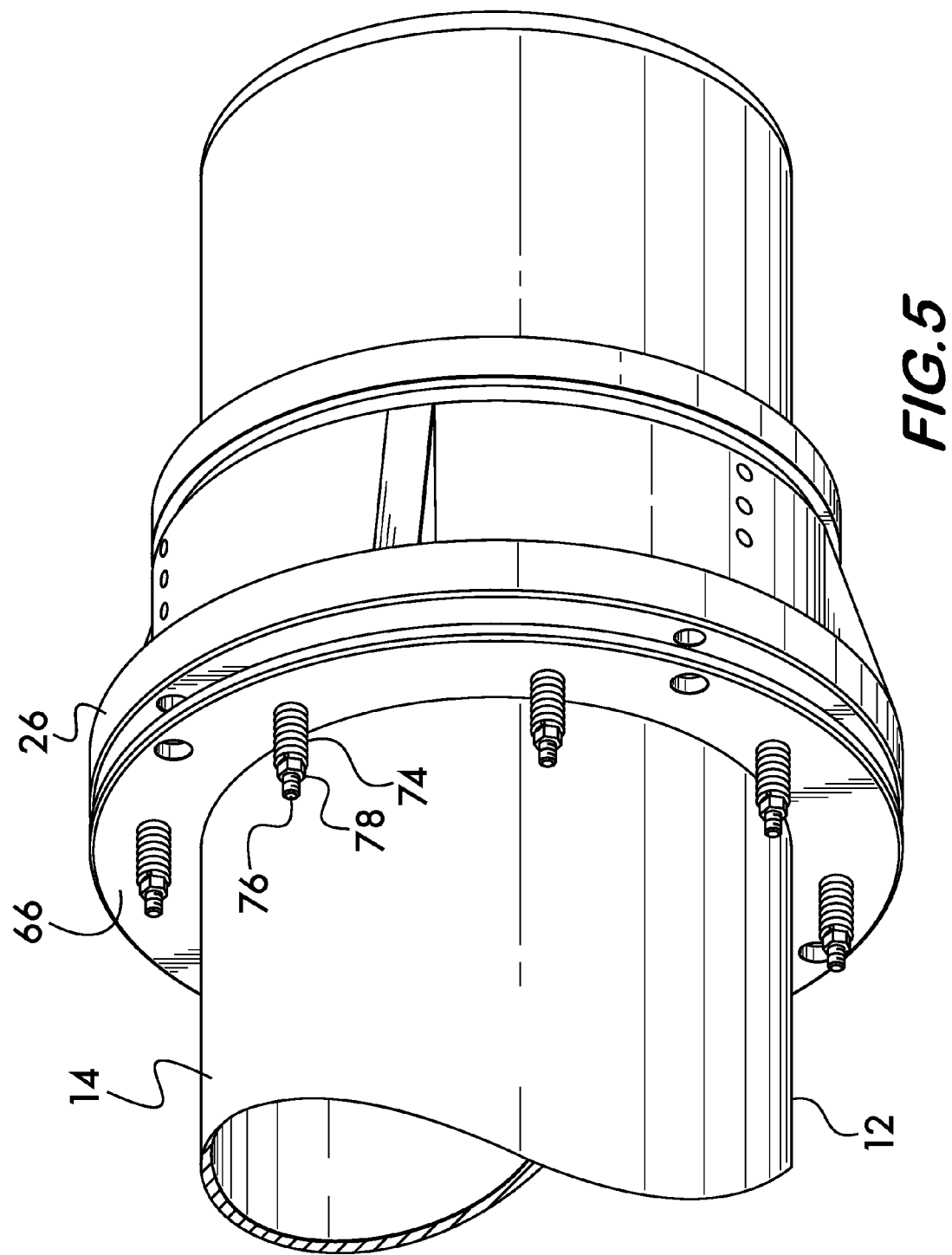
FIG. 5 is an isometric view of an example expansion joint embodiment.

As shown in FIG. 4, it is advantageous to bias the hoop 66 into engagement with the packing material 64 using spring elements 74. The spring elements are positioned on the adjustable fasteners, in this example comprising threaded shafts 76 connecting the hoop 66 to the ring 26. Spring elements 74 are positioned between compression nuts 78 and the hoop leg 70. In this configuration, tightening the nuts 78 compresses the spring elements 74 against the hoop 66, thereby compressing the hoop against the packing material 64 and also maintaining the compression at a substantially constant compression force as the packing material 64 deteriorates and the hoop 66 moves toward the ring 26. Using biasing spring elements 74 lessens the potential need for periodic tightening of the nuts 78. FIG. 5 shows an isometric view of the spring biased hoop 66 engaged with the ring 26.

Figure 6:
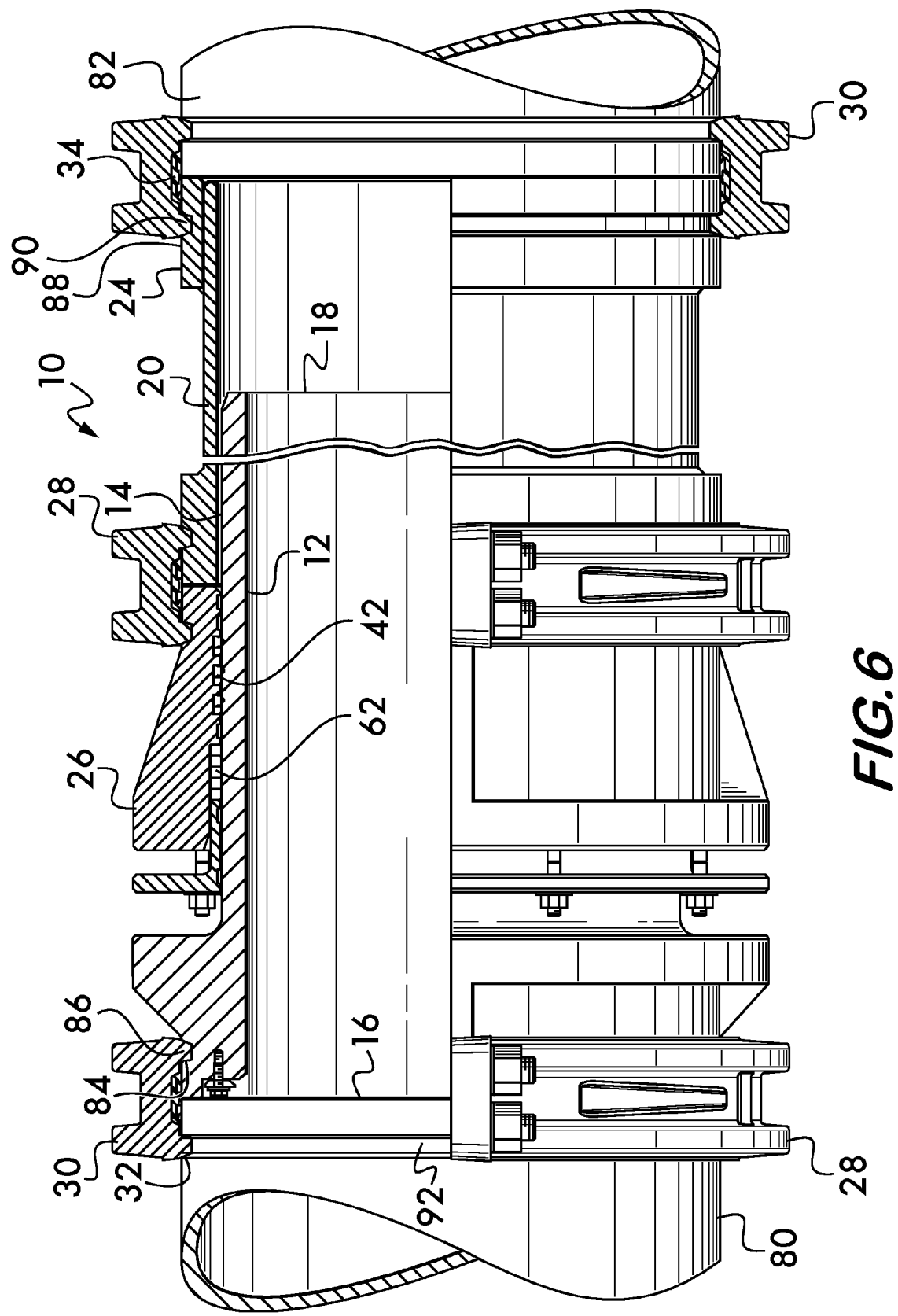
FIG. 6 is a partial sectional view of an example expansion joint in a pipeline.

FIG. 6 shows the example expansion joint 10 mounted in a pipe line. A first pipe element 80 of a portion of the pipe line is connected to first end 16 of tube 12, and a second pipe element 82 is connected to the second end 24 of the sleeve 20. The second end 18 of the tube 12 is received coaxially within the ring 26 and within the sleeve 20. Tube 12 is in sliding sealing engagement with the seals 42 and 62 of ring 26 and in telescoping engagement with the sleeve 20. In this example, attachment of the ring 26 to sleeve 20 is effected by a mechanical pipe coupling 28 (shown in detail in FIG. 2 and described above). Attachment of the pipe elements 80 and 82 is effected similarly, but could also be accomplished by bolted flange joints. As shown in FIG. 6, the first end 16 of tube 12 has an outwardly facing surface 84 with a circumferential groove 86 therein. Similarly, the second end 24 of the sleeve 20 has an outwardly facing surface 88 with a circumferential groove 90 therein. Another coupling 28, having segments 30 with keys 32, engages groove 86 in the first end 16 of tube 12 and a groove 92 in the end of the first pipe element 80. Second pipe element 82 is similarly attached to the second end 24 of sleeve 20. In this way the couplings 28 mechanically lock the sleeve 20 to the ring 26, the first pipe element 80 to the tube 12 and the second pipe element 82 to the sleeve 20, with the interfacing of the keys and grooves providing positive mechanical engagement. As further shown in FIG. 6, ring gaskets 34 extend circumferentially around each interface between the ring 26 and the sleeve 20, the tube 12 and pipe element 80, and the sleeve 20 and pipe element 82. The ring gaskets 34 are compressed by the segments 30 against outwardly facing sealing surfaces on the ring 26, sleeve 20 and pipe elements 80 and 82 to provide a fluid tight connection at each coupling 28. Use of mechanical couplings to join the tube 12 to the pipe element 80, the ring 26 to the sleeve 20, and the sleeve 20 to the pipe element 82 provide the added advantage of allowing the expansion joint 10 to be rotated about its longitudinal axis without disassembling the joint. It is merely necessary to loosen the fasteners holding the segments 30 in end to end relation, thereby relieving the clamping force of the couplings 28. The expansion joint 10 may then be rotated relatively to the pipe elements 80 and 82, and the fasteners re-tightened to secure the expansion joint to the pipe elements. The ability to rotate the expansion joint is useful to extend the life of the joint in the face of abrasive wear encountered when abrasive slurries are pumped through the joint. The abrasive wear is not evenly distributed over the interior surfaces of the expansion joint, but tends to be concentrated on the lower most surfaces. This is because the abrasive matter tends to settle within the flow stream, and concentrates near the lowermost surfaces of the expansion joint. If the expansion joint 10 is periodically rotated about its longitudinal axis it distributes the wear more evenly over the interior surface of the expansion joint which a result of the uneven distribution of abrasive particles within the flow. Rotation of the joint is also effective in extending the life of the joint when a liner (as shown in FIG. 1) is present within the tube 12.

Relative axial motion between the tube 12, and the ring 26 and sleeve 20 is caused by thermally induced expansion and contraction of the pipe elements comprising the pipe line. For most materials, heating of the pipe line will cause it to lengthen in proportion to its length and the increase in temperature. This will cause the ring 26 along with the attached sleeve 20 to move toward the first end 16 of tube 12, and the second end 18 of tube 12 to move deeper into the sleeve 20. Conversely, a decrease in temperature will cause the ring 26 and the attached sleeve 20 to move away from the first end 16 of tube 12, and the second end 18 of tube 12 to move out of deeper engagement with the sleeve 20.

Alternately, the connection between the pipe elements 80 and 82 and the expansion joint 11 could be effected by interfacing flanges extending radially outwardly at the ends of the pipe elements and expansion joint, the flanges being bolted together using threaded fasteners. Welding is also an option for connection, but mechanical coupling methods (i.e., segmented couplings and flanged couplings) have the advantage of ease of installation and removal, which may be useful when constructing the pipe line and later for replacing expansion joints as they wear.

There is a preferred direction of flow through the expansion joint 10, which is from tube end 16 to tube end 18. This preferred direction of flow avoids disruptions to the flow which would occur for flow passing in the opposite direction over the end 18 of tube 12, which poses an abrupt change in cross sectional area to the flow and may cause turbulence and its associated increased wear rate. Use of a preferred flow direction reduces abrasive wear of the tube 12 when slurries having a high particulate content, such as oil bearing tar sands or mining tailings are being transported through the piping network.

Operation of the expansion joint 10 can be readily visualized using FIG. 6. For example, an increase in ambient temperature causes the pipe elements such as 80 and 82 along the pipe line to increase in length. As a result, the expansion joint 10 experiences a compressive force, as the lengths of the pipes connected respectively to the tube 12 and the sleeve 20 grow longer. The compressive force is applied to the expansion joint 10 at the end 16 of the tube 12 and at the end 24 of sleeve 20. This causes the tube 12 and the ring 26 and sleeve 20 to move in opposite directions axially toward one another, as a significant constraint on this motion is the friction between the seals 42 and 62 (fixed to the ring 26) and the outer surface 14 of the tube 12, which cannot resist the applied axial force. Similarly, with a decrease in ambient temperature, the pipe line cools and the pipe elements contract, placing a tension force on the expansion joint 10. The axially shrinking pipe line pulls the tube 12 and sleeve 20 in opposite directions, and again, a significant constraint against axial motion is the friction at the interface between seals 42 and 62 and outer surface 14 of tube 12, which gives way to permit the relative motion. In practical applications, for a steel pipe line, the coefficient of linear expansion of steel results in a change in length of ¾ of an inch for every 100 feet of pipe line for every 100° F. change in temperature. Depending upon the range of ambient temperature swing and the lengths of pipe line between expansion joints, the expansion joint 10 may have to accommodate up to about 40 inches of travel.

While it is possible to design expansion joints 10 for a wide range of axial travel, it is sometimes found economical to manufacture expansion joints with the same axial travel range and arrange them in series in a compound expansion joint when calculations predict that more travel will be required for a particular installation than can be accommodated by a single expansion joint. It can be appreciated that the arrangement of two expansion joints arranged in series doubles the length of potential axial travel in comparison with using a single expansion joint of the same type. The number of expansion joints useable end to end to tailor the expansion capacity to a particular application is not limited to two, and it is foreseen that practical limitations will allow for great versatility in design.

Figure 7:
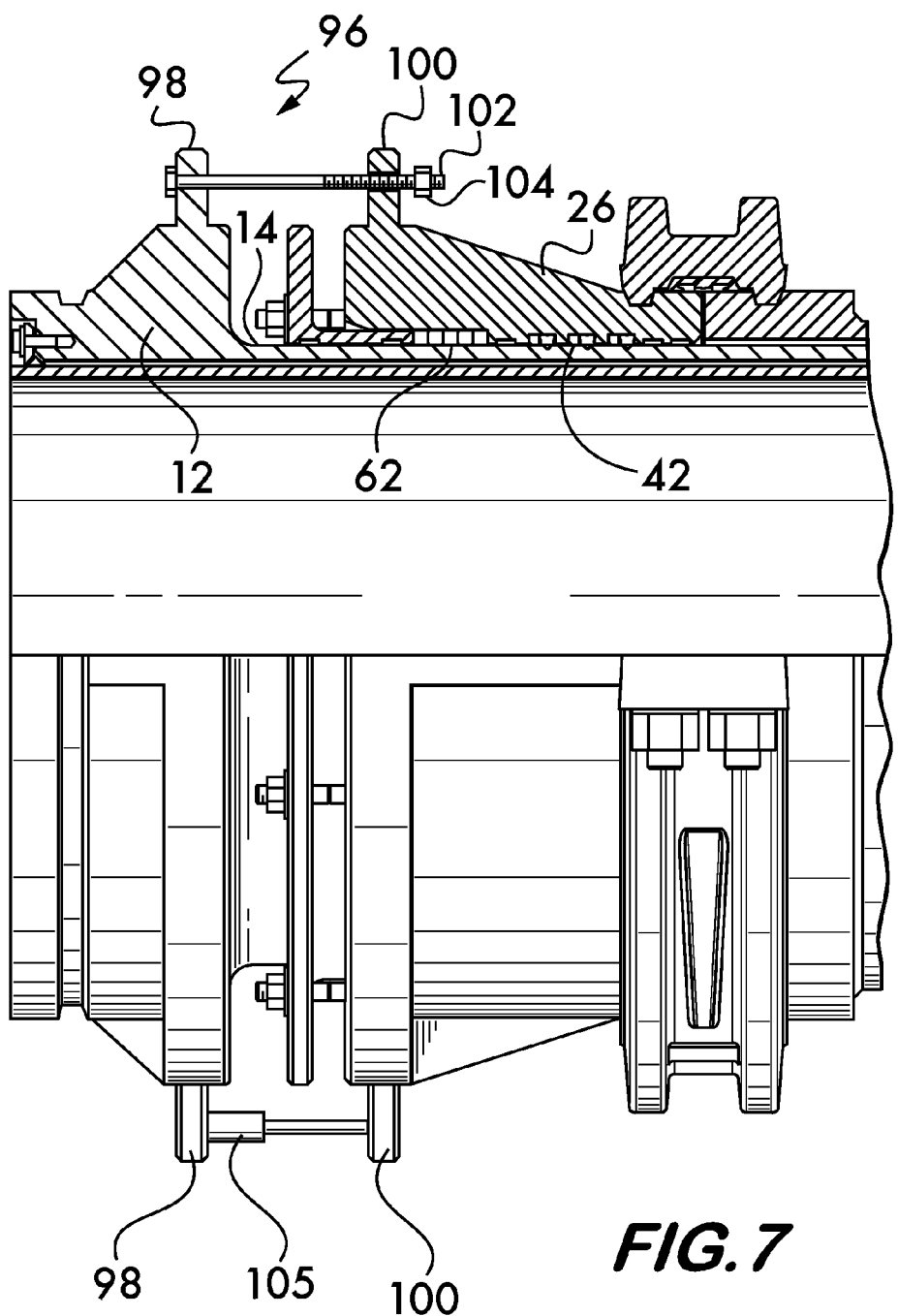
FIG. 7 is a partial sectional view of an example expansion joint embodiment.

It is advantageous to employ an externally visible indicator/stop on the expansion joint 10 to indicate the degree of engagement between tube 12 and the sleeve 20. In an example shown in FIG. 7, an indicator/stop 96 comprises a first lug 98 projecting outwardly from the outer surface 14 of the tube 12, and a second lug 100 projecting outwardly from the outwardly facing surface of the ring 26. A rod 102 may be attached to either one of the lugs 98 and 100 and passed through a hole in the other lug. The rod may be calibrated, with a length scale for example, and serve to measure the relative motion and position between the tube 12 and ring 26 and sleeve 20. Indicator/stop 96 may be used to initially position the tube 12 relative to the sleeve 20 when the expansion joint 10 is being installed in a pipe line so that there is sufficient length of travel in both expansion and contraction to accommodate the expected pipe line length excursions. To fulfill the stop function of the indicator/stop 96, the rod 102 may have a projection extending radially outwardly to engage the lug through which it passes and limit the relative motion between sleeve 20, ring 26 and tube 12. In the example shown, the projection comprises a nut 104 threaded to the end of the rod 102, however, it is also contemplated that other forms of projection may be used, and be adjustably positionable at any point along the rod to set a stop point for motion between tube 12 and ring 26. Multiple indicator/stops 96 may of course be used as stops to distribute the load from expansion or contraction, and multiple projections may be used, for example, one on either side of the lugs to allow limits on both expansion and contraction of the joint to be effected. Use of the indicator/stop 96 is advantageous when multiple expansion joints 10 are used in series to force all of the expansion joints to operate to accommodate the pipe line motion. It is conceivable that one expansion joint may have lower frictional forces between its tube and ring than the other expansion joints in the series. If not for the indicator/stop 96, this one expansion joint might therefore take all of the motion, which, for pipe line contraction, could result in a disengagement between the tube 12 and sleeve 20.

It is expected that the frictional forces between the seals 42 and 62 and the outer surface 14 of tube 12 that resist axial motion between the tube 12 and the ring and sleeve 26 and 20 will be large due to the high radial preload between the seals and the surface 14 necessary to ensure fluid tightness against the internal pressure within the expansion joint 10. Therefore, it is advantageous to use powered actuators, for example hydraulic actuators 105, temporarily positioned between the lugs 98 and 100, to apply axially directed forces to the tube and the ring to assemble and disassemble the expansion joint 10 and establish the desired degree of engagement between the tube 12 and the sleeve 20.

Figure 8:
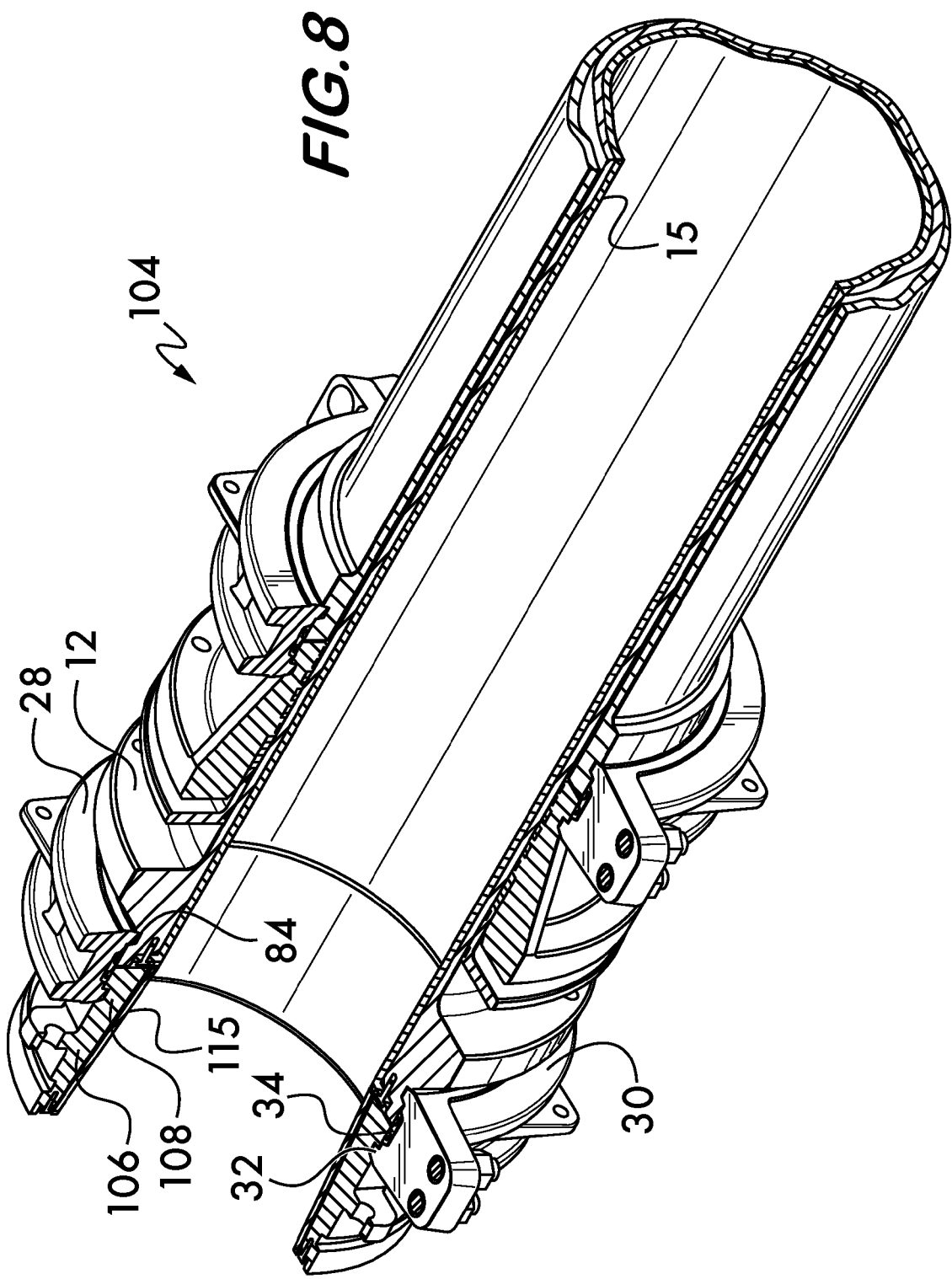
FIG. 8 is a partial sectional isometric view of an example expansion joint embodiment.

As noted above, it is advantageous to periodically rotate the expansion joint about its longitudinal axis to more evenly distribute the abrasive wear caused by the uneven distribution of abrasive particles in a slurry passing through the joint. The abrasive particles tend to settle and concentrate near the lowermost surfaces of the expansion joint, and thereby cause an accelerated wear rate along these lower portions of the joint than along the upper surfaces. However, it is also observed that the inlet to the expansion joint suffers a higher localized abrasive wear rate than other parts of the joint. To further increase the life of the expansion joint, and to facilitate repair of worn parts, it is advantageous to form the inlet portion of the expansion joint from a separate, removable component. An example embodiment of such an expansion joint 104 is shown in FIG. 8. Expansion joint 104 comprises an inlet segment 106, coupled to the tube 12 by a mechanical coupling 28. Coupling 28 comprises segments 30 bolted together end to end surrounding an end of the inlet segment 106 and the tube 12. In this example expansion joint, both the inlet segment 106 and the tube 12 have circumferential grooves 84 and 108 at their respective ends which receive keys 32 on the coupling segments 30, as shown in FIG. 8. Engagement between the keys 32 and grooves 84 and 108 provides positive mechanical engagement between the coupling 28 and the component parts which it joins. The gasket 34 captured between the coupling segments 30, the inlet segment 106 and the end of tube 12 ensures a fluid tight joint between the inlet segment and the tube. Other types of mechanical couplings, for example, interfacing bolted flanges positioned on inlet segment 106 and tube 12, are also feasible for effecting a connection between inlet segment and tube which allows easy removal of the inlet segment from the tube.

Figure 9:
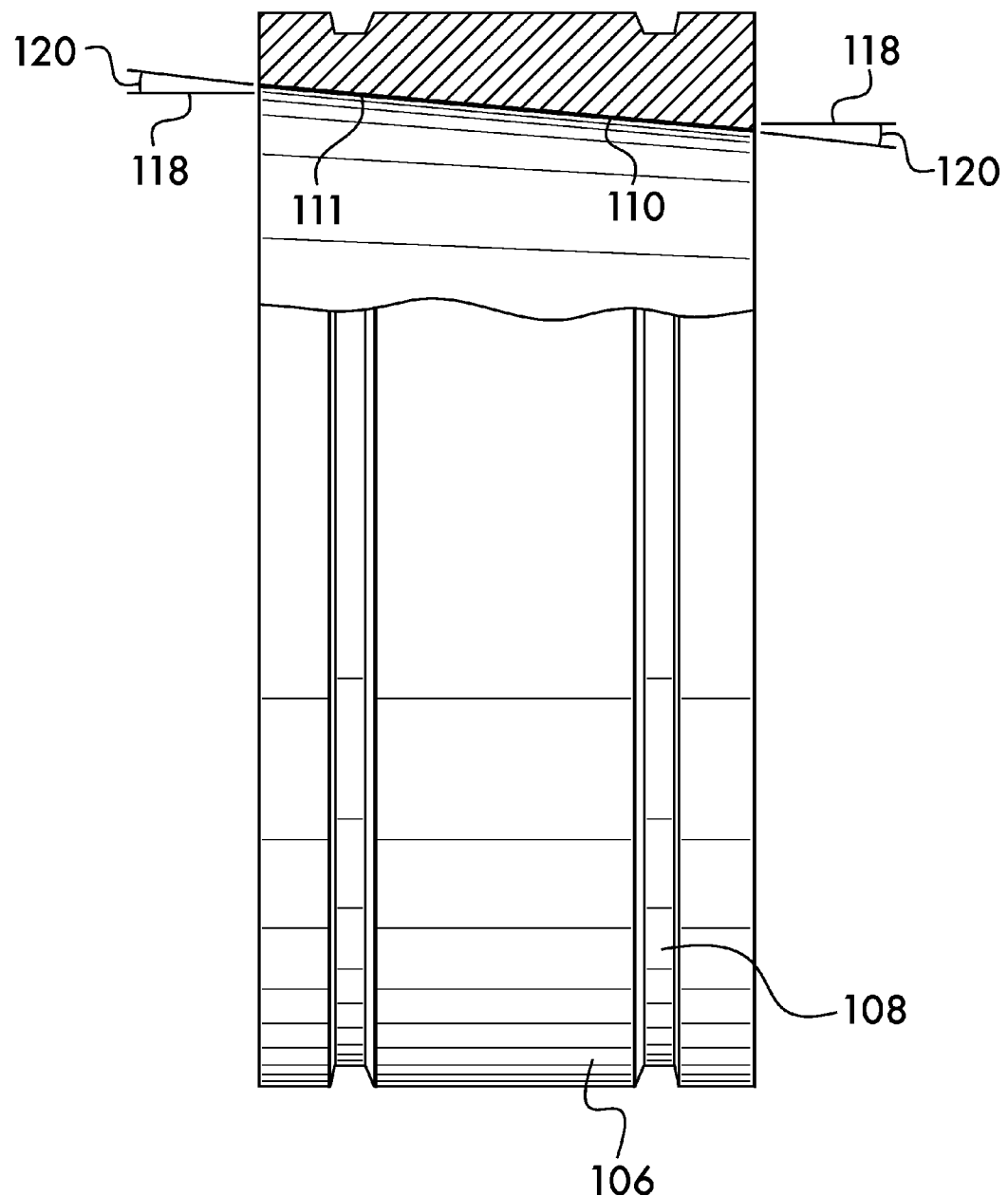

FIGS. 9, 9A, 9B and 9C provide detailed sectional views of example inlet segments 106. To reduce turbulence in the flow transition between a pipe element (not shown) and the tube 12 (see also FIG. 8), the inner surface 110 of the inlet segment 106, positioned between the pipe element and the tube, may be tapered. The taper may be a straight, conical taper 111 as depicted in FIG. 9. Alternately, as shown in FIG. 9A, inner surface 110 may have an "S" shape with an inflection point 112 between the ends of the inlet segment which marks the transition between a concave surface portion 114 and a convex surface portion 116. Additionally, the inner surface 110 near each end of the inlet segment 106 may be angularly oriented with respect to a datum line 118 parallel to the longitudinal axis of the inlet segment. Orientation angles 120 of about 3° are advantageous, with angles as high as 10° or as low as 2° being practical.

By making the inlet portion of the expansion joint 104 into a separate component 106, maintenance and repair of the expansion joint is simplified. For example, to prolong the joint life, the inlet segment 106 alone may be rotated about its longitudinal axis to even out the abrasive wear. The period of rotation is based upon time in service and service conditions such as flow rate and concentration of abrasive matter. This is simpler than rotating the entire expansion joint 104. Furthermore, when rotation of the inlet segment 106 will no longer suffice to provide a segment of acceptable thickness, it is only necessary to replace the inlet segment 106, rather than the entire expansion joint 104. Replacement is further facilitated by the use of mechanical couplings 28 (see FIGS. 2 and 8), which allow simple bolting and unbolting of the coupling segments to permit replacement of the inlet segment 106.

Figure 9B:
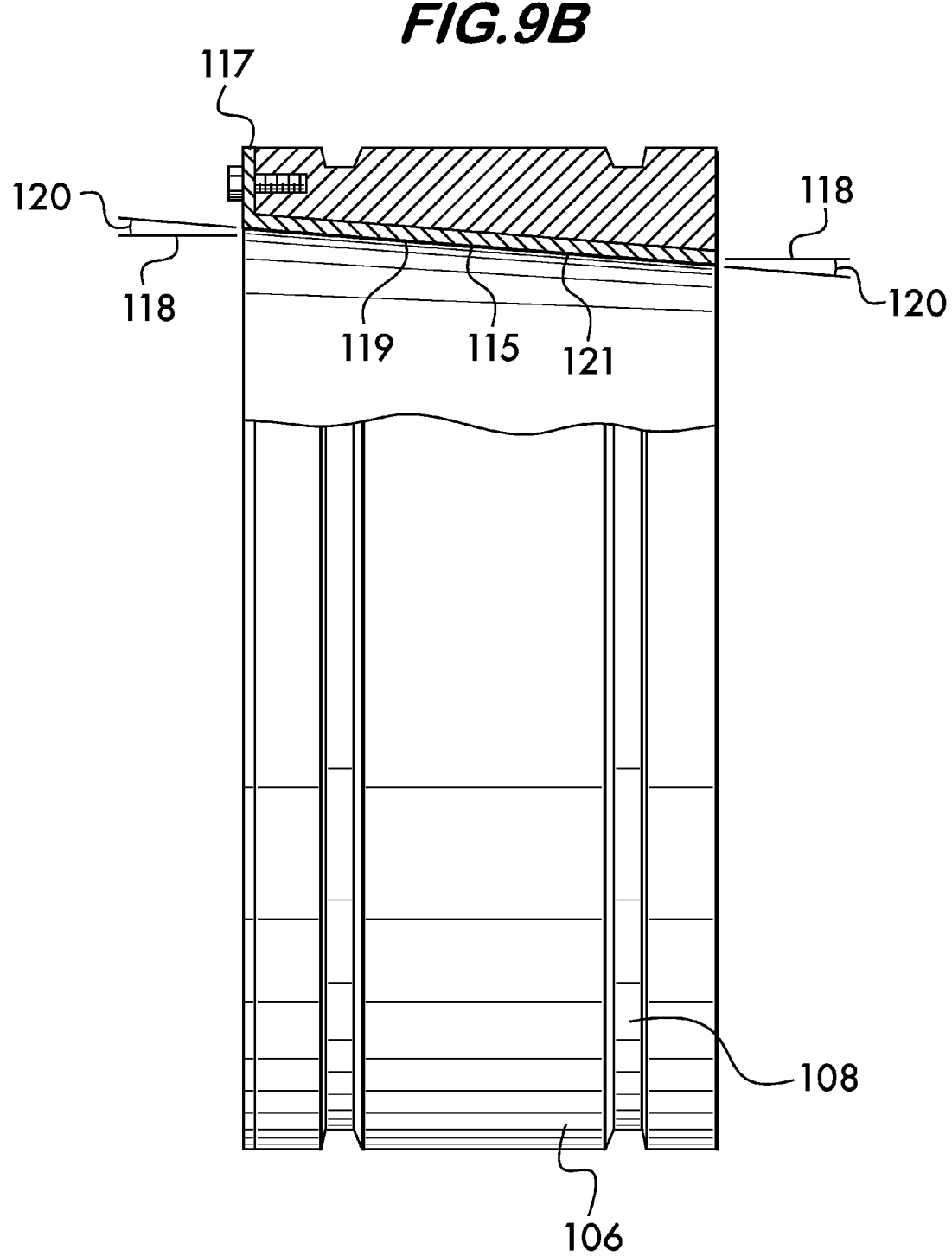

Maintenance and repair may be further improved economically by the use of an abrasion resistant liner 115 positioned within the inlet segment 106 as shown in FIG. 9B. Liner 115 may comprise for example, hardened steel, or have a chromium carbide overlay, or comprise a ceramic which is abrasion resistant. As the liner 115 provides a sacrificial surface (preventing wear of the inlet segment 106) it is further advantageous that the liner 115 be easily removable from the inlet segment to allow ready replacement of spent liners. To facilitate removability, the liner 115 may have a flange 117 which is bolted to an end of the inlet segment. As with the inlet segment inner surface 110, the inner surface 119 of the liner 115 may be shaped to reduce turbulence. The liner inner surface 119 may have a straight, conical taper 121 as depicted in FIG. 9B, or, as shown in FIG. 9C, inner surface 119 of liner 115 may have an "S" shape with an inflection point 112 between the ends of the inlet segment which marks the transition between a concave surface portion 114 and a convex surface portion 116.

Figure 10:
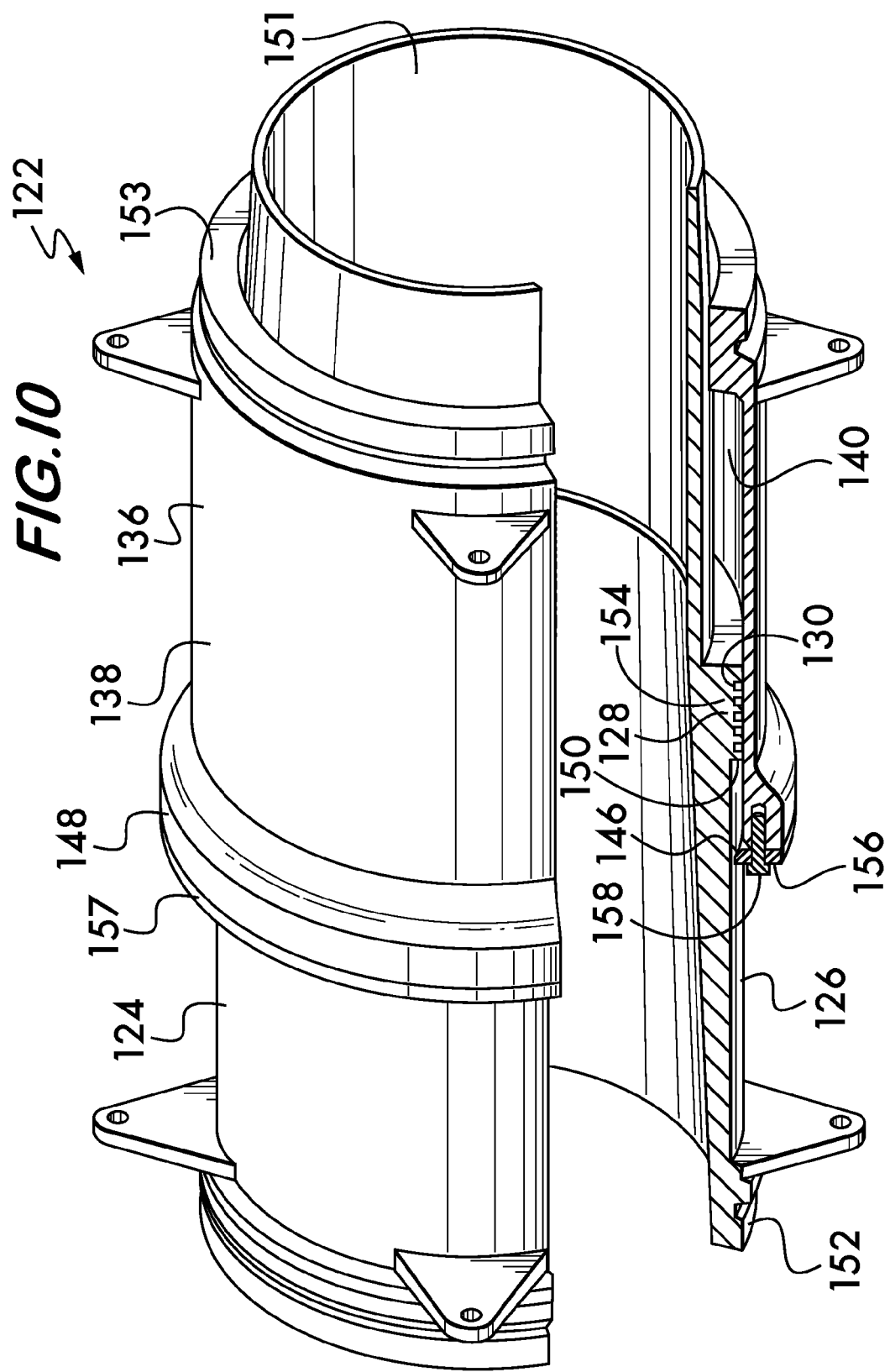
FIG. 10 is a partial sectional isometric view of an example expansion joint embodiment.

FIG. 10 is a partial sectional isometric view of another example expansion joint 122 for connecting pipe elements in a pipe line to one another while accommodating thermally induced axial expansion and contraction of the pipe line. Expansion joint 122 comprises a tube 124. Tube 124 has an outer surface 126 on which a seal 128 is mounted. In this example, seal 128 comprises a plurality of circumferential grooves 130 positioned in the outer surface 126 of the tube 124. As shown in FIG. 11, one or more of the grooves 130 receives a sealing element 132, such as an O-ring. Other types of sealing elements, such as quad rings and engineered lip seals are also feasible. In addition to the sealing elements, anti-extrusion rings 134 may also be positioned within the grooves 130 adjacent to each sealing element 132. Anti-extrusion rings 134 are installed within grooves 130 on the low pressure side of the sealing elements 132 and help prevent extrusion of the sealing elements into the gap between the tube 124 and the sleeve 136 to which the tube 124 is joined (described below). Sealing elements and the anti-extrusion rings may be made of compliant materials such as EPDM, nitrile and other natural and synthetic rubber compounds, as well as other polymers such as PTFE, nylon, polyurethane and PEEK.

As shown in FIG. 10, the aforementioned sleeve 136 surrounds a portion of the tube 124. Sleeve 136 has an outer surface 138 and an inwardly facing inner surface 140. The inwardly facing inner surface 140 is smooth and sized to engage the seal 128. In this example, sealing elements 132 are captured within their respective grooves 130 and compressed between the outer surface 126 of tube 124 and the inner surface 140 of the sleeve 136 to effect a fluid tight seal between sleeve and tube. The smooth inner surface 140 of sleeve 136 facilitates the fluid tight seal and allows the sleeve 136 and tube 124 to slide axially relatively to one another. It is further advantageous to position other functional elements in grooves 130. For example, as shown in FIG. 11, one or more wiper elements 142, comprising, for example, quad rings formed of plastic such as PTFE, may be placed in one or more of the grooves 130. Wiper elements serve to clean the outer surface 126 of tube 124 of foreign matter which might otherwise damage the sealing elements 132. This is especially useful when the expansion joint is carrying abrasive slurries, which may work their way into the gap between the tube 124 and the sleeve 136, and thereby contaminate the tube outer surface 126. Additionally, bearing elements 144, for example, rings formed of plastic such as PTFE, or fiber reinforced composites formed of graphite, may also be positioned within grooves 130 to support and guide the tube 124 and sleeve 136 during relative motion between the two components.

Figure 12:
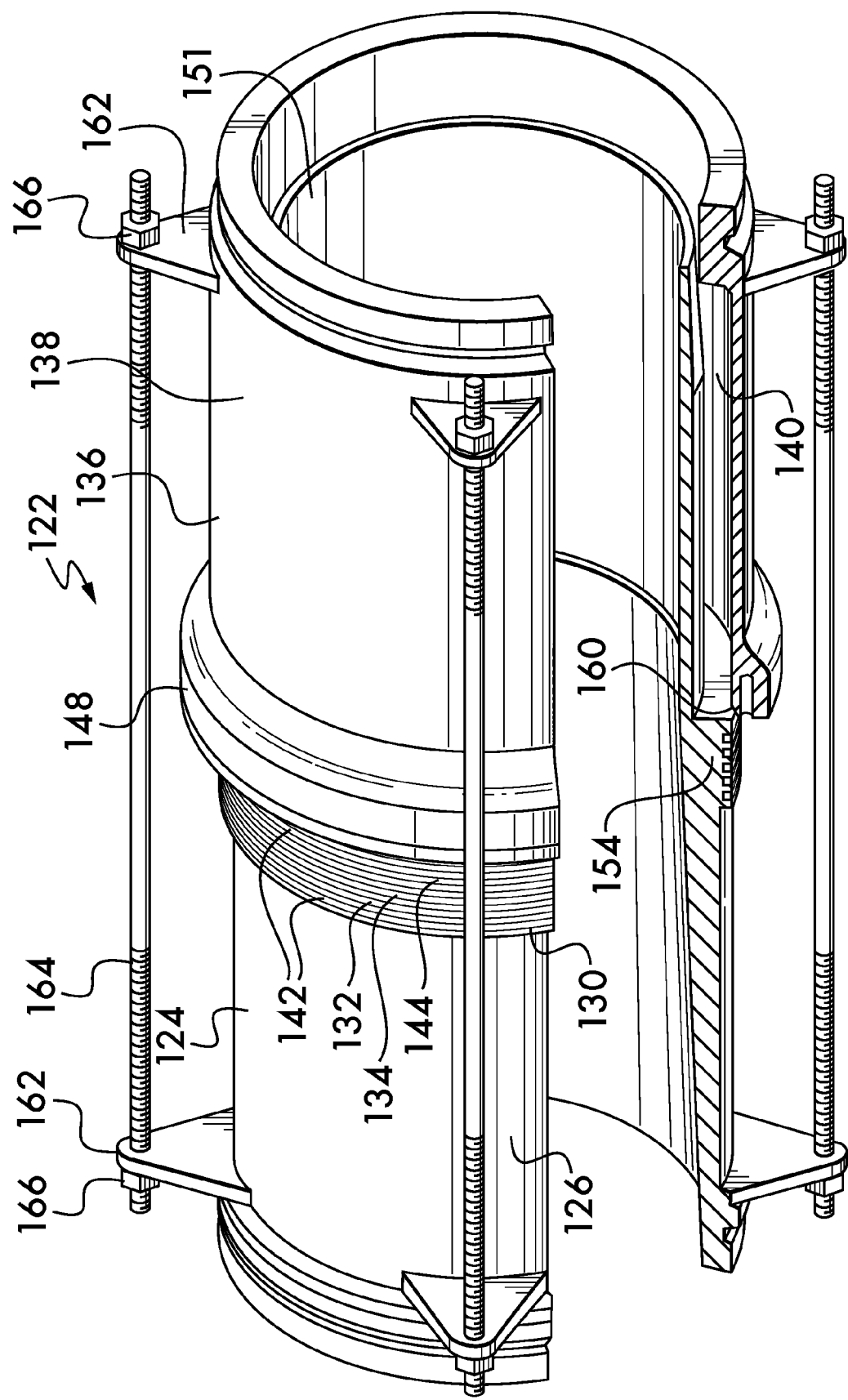
FIG. 12 is a partial sectional isometric view of the expansion joint of FIG. 10 being assembled.

With reference again to FIG. 10, a surface 146 is positioned at one end 148 of sleeve 136. Surface 146 projects transversely from the inner surface 140 of sleeve 136 toward the tube 124. Another surface 150 projects transversely outwardly from the outer surface 126 of the tube 124, the surface 150 being positioned between the seal 128 and the end 152 of the tube 124. Surface 146 on sleeve 136 is engageable with surface 150 on tube 124 and, when in contact, the surfaces act as a stop to limit relative axial sliding motion between the tube and sleeve. It is practical to make the surface 150 integral with the outer surface 126 of tube 124 and have it be part of a raised grooved surface 154 comprising the seal 128. It is furthermore practical for the surface 146 on the sleeve 136 to be formed from a plurality of curved segments 156 which are bolted to the sleeve 136 using fasteners 158 to form a flange 157 attached to the end 148 of the sleeve 136. These sleeve structures facilitate assembly of the expansion joint 122 as shown in FIG. 12. The tube 124 is prepared by first positioning sealing elements 132, anti-extrusion rings 134, wiper elements 142 and bearing elements 144 in grooves 130 in the outer surface 126 of the tube 124. The sealing elements, wipers and bearings may be lubricated, and the end 151 of the tube 124 is inserted co-axially into the sleeve 136 from its end 148. Insertion of the tube into the sleeve is made possible by a chamfer 160 on the inside of sleeve 136 at end 148. Chamfer 160 acts as a lead-in to guide the tube 124 and initiates compression of the sealing elements 132, wiper elements 142 and bearing elements 144. The inner surface 140 of sleeve 136 may also be lubricated to facilitate sliding motion between tube and sleeve. Note that the surface 146 on the sleeve 136 (see FIG. 10) is not yet installed to permit the sleeve to pass over the raised groove surface 154 which defines the surface 150 on the tube 124. As it takes considerable force to insert the tube 124 into the sleeve 136 so that the sealing elements engage the smooth, inner surface 140 of the sleeve, it is advantageous to attach lugs 162 to the respective outer surfaces 126 and 138 of the tube and sleeve, and run threaded rods 164 between the lugs. By tightening nuts 166 on the rods 164 it is possible to force the tube 124 into the sleeve 136 evenly, so that it does not cock and damage the sealing elements, which are under considerable compression between the tube and the sleeve. Once the end 148 of sleeve 136 is past the surface 150 on tube 124 the segments 156 may be bolted to the end 148 of sleeve 136 to form the flange 157 providing the surface 146 (see FIG. 10). The threaded rods 164 can be removed and assembly of the expansion joint 122 is complete as shown in FIG. 10.

FIG. 13 shows the example expansion joint 122 mounted in a pipe line. A first pipe element 168 of a portion of the pipe line is connected to end 152 of the tube 124, and a second pipe element 170 is connected to an end 153 of the sleeve 136. In this example, connection of the expansion joint 122 with the pipe elements 168 and 170 is effected by mechanical pipe couplings 28 (see also FIG. 2) comprising individual segments 30 which are bolted together surrounding the ends of the pipe elements and the expansion joints. Tube end 152 and sleeve end 153, as well as the ends of pipe elements 168 and 170 have circumferential grooves 172 which receive the radially inwardly projecting keys 32 extending from the segments 30. Keys 32 of the respective segments 30 engage the grooves 172 in both the pipe elements 168 and 170 and the expansion joint components (tube 124 and sleeve 136) and mechanically lock them in end to end relation, with the interfacing of the keys and grooves providing positive mechanical engagement. Gaskets 34 extend circumferentially around each interface between the pipe elements and the expansion joint and are compressed by the segments against sealing surfaces on the pipe elements and the expansion joint to provide a fluid tight connection. Alternately, the connection between the pipe elements 168 and 170 and the expansion joint 122 could be effected by interfacing flanges extending radially outwardly at the ends of the pipe elements and expansion joints, the flanges being bolted together. Welding is also an option for connection, but mechanical coupling methods (i.e., segmented and flanged couplings) have the advantage of ease of installation and removal, which may be useful when constructing the pipe line and later for replacing expansion joints as they wear.

The advantage of having sleeve 136 shorter than tube 124 is illustrated in FIG. 13, as it permits end 151 of the tube 124 to extend into the downstream pipe element 170. Note that there is a preferred direction of flow through the expansion joint 122, which is from tube end 152 to tube end 151. The tube 124 is designed with a bore 174 having a gradual internal taper from end 152 to end 151 to permit it to be inserted into sleeve 136 and pipe element 170 while also avoiding disruptions to the flow, which may cause turbulence. This design reduces abrasive wear of the tube 124 when slurries having a high particulate content, such as oil bearing tar sands or mining tailings are being transported through the piping network. Insertion of the tube end 151 into the downstream pipe element 170 prevents flowing slurry from contacting the smooth inner surface 140 of the sleeve 136, thereby protecting this surface from abrasion due to flow through the expansion joint.

Operation of the expansion joint 122 can be readily visualized using FIG. 13. For example, an increase in ambient temperature causes the pipe elements along the pipe line to increase in length. As a result, the expansion joint 122 experiences a compressive force, as the lengths of pipe connected at each end of the joint grow longer. The compressive force is applied to the expansion joint 122 at the end 152 of the tube 124 and the end 153 of the sleeve 136. This causes the sleeve and tube to move in opposite directions axially toward one another, as a significant constraint on this motion is the friction between the sealing elements 132 (and other components fixed on the tube 124) and the inner surface 140 of the sleeve 136, which cannot resist the applied axial force. Similarly, with a decrease in ambient temperature, the pipe line cools and contracts, placing a tension force on the expansion joint 122. The axially shrinking pipe line pulls the tube and sleeve in opposite directions, and again a significant constraint against axial motion is merely the friction at the interface between the sealing elements 132 (and other components fixed on the tube 124) and inner surface 140 of sleeve 136, which is overcome to permit the relative motion. In practical applications, for a steel pipe line, the coefficient of linear expansion of steel results in a change in length of ¾ of an inch for every 100 feet of pipe line for every 100° F. change in temperature. Depending upon the range of ambient temperature swing and the lengths of pipe line between expansion joints, the expansion joint 122 may have to accommodate up to about 40 inches of travel.

While it is possible to design expansion joints 122 for a wide range of axial travel, it is sometimes found economical to manufacture expansion joints with the same axial travel range and arrange them in series when calculations predict that more travel will be required for a particular installation than can be accommodated by a single expansion joint.

Figure 14:
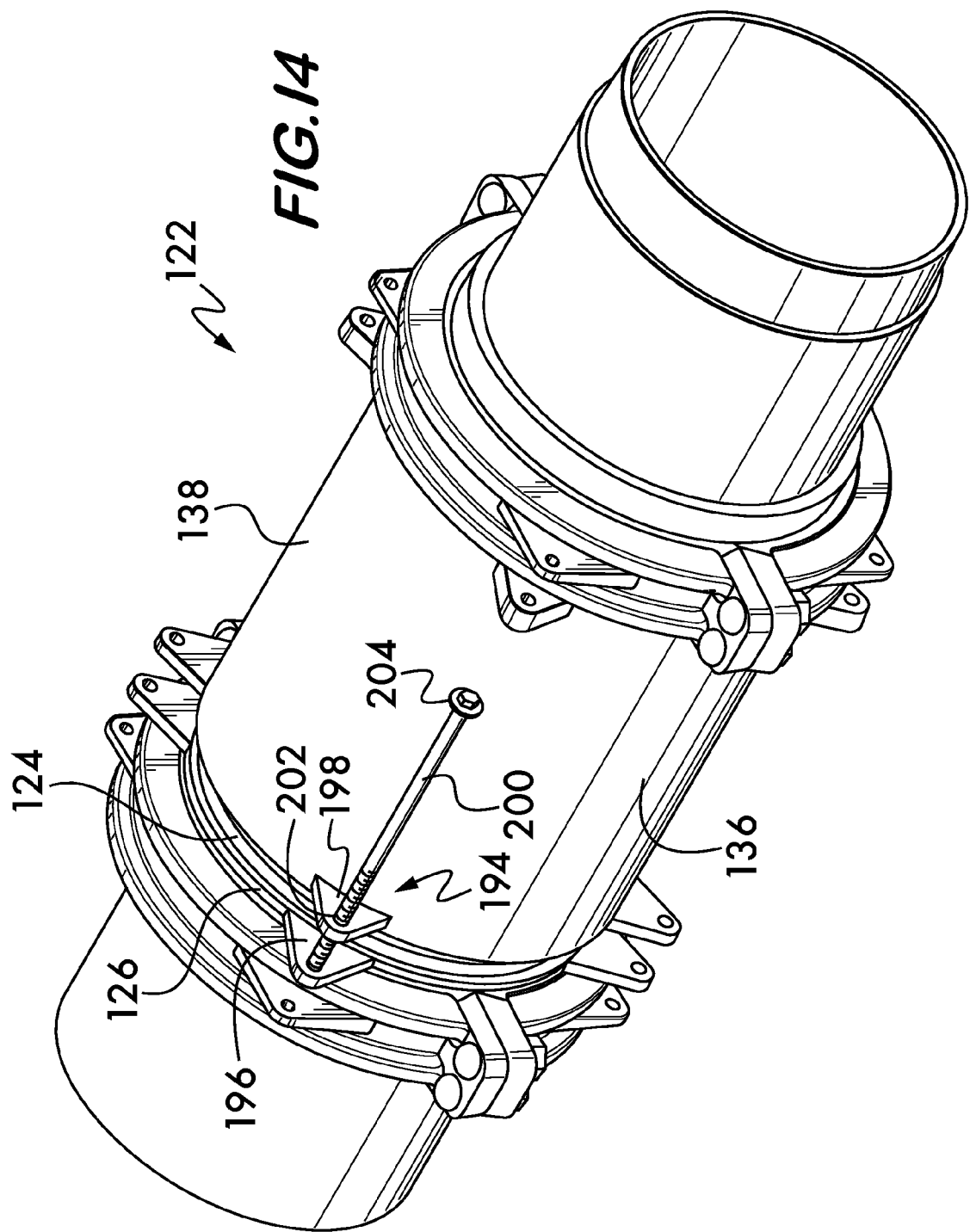
FIG. 14 is an isometric view of an example expansion joint embodiment.

As shown in FIG. 14, it is advantageous to employ an externally visible indicator/stop 194 on the expansion joint 122 to indicate the degree of engagement between tube 124 and sleeve 136. In this example indicator/stop 194 comprises a first lug 196 attached to the outer surface 126 of the tube 124, and a second lug 198 attached to the outer surface 138 of the sleeve 136. A rod 200 may be attached to either one of the lugs, in this example, lug 196 on tube 124, and passed through a hole 202 in the other lug 198 on the sleeve 136. The rod 200 may be calibrated, with a length scale for example, and serve to measure the relative motion and position between the tube 124 and sleeve 136. Indicator/stop 194 may be used to initially position the sleeve relative to the tube when the expansion joint 122 is being installed in a pipe line so that there is sufficient length of travel in both expansion and contraction to accommodate the expected pipe line length excursions. To fulfill the stop function of the indicator/stop 194, rod 200 may have a projection 204 extending radially outwardly to engage the lug 198 and limit the relative motion between sleeve and tube. In this example the projection is a washer bolted to the end of rod 200, however, it is also contemplated that other forms of projection may be used, and be adjustably positionable at any point along rod 200 to set a stop point for motion between sleeve and tube. Multiple indicator/stops 194 may of course be used as stops to distribute the load from expansion or contraction, and multiple projections may be used, for example, one on either side of lug 198 to allow limits on both expansion and contraction of the joint to be effected. Use of the indicator/stop 194 is advantageous when multiple expansion joints 122 are used in series to force all of the expansion joints to operate to accommodate the pipe line motion. It is conceivable that one expansion joint may have lower frictional forces between its tube and sleeve than the other expansion joints in the series. If not for the indicator/stop 194, this one expansion joint might therefore take all of the motion, which, for pipe line contraction, could result in disengagement between the tube and sleeve.

What is claimed is:

1. An expansion joint for connecting pipe elements, said expansion joint comprising:
    a tube having an inner surface defining an inner diameter, an outer surface surrounding said inner surface and first and second ends oppositely disposed;
    an inlet segment having a smooth inner surface, an outlet end connected to said first end of said tube, and an inlet end oppositely disposed therefrom, said outlet end having an inner diameter that is smaller than an inner diameter of said inlet end, said inner diameter of said outlet end being equal to said inner diameter of said tube, said inlet segment being connected to said tube by an externally mounted mechanical coupling;
    a sleeve having first and second ends oppositely disposed, said sleeve being positioned surrounding at least a portion of said tube, said portion including said second end of said tube, said sleeve having a constant inner diameter over its entire longitudinal length, said inner diameter being larger than an outer diameter of said tube;
    a ring, separate from said sleeve and removably attachable to said first end thereof, said ring surrounding said tube and having an inner surface facing said outer surface of said tube, said ring supporting said sleeve on said tube only at said first end of said sleeve;
    at least one inwardly facing circumferential groove positioned in the inner surface of said ring;
    at least one bearing element positioned within said at least one groove;
    an externally mounted coupling positioned circumferentially around a portion of both said ring and said first end of said sleeve, said coupling removably attaching said ring to said sleeve;
    a seal mounted on said inner surface of said ring and sealingly engaging said outer surface of said tube, said ring and said sleeve being slidably movable axially relatively to said tube;
    a hoop attached to said ring and surrounding said tube and positioned radially and longitudinally between said ring and said tube, said hoop being positioned adjacent to a packing material, said packing material being captured between said hoop and a shoulder of said ring.

2. The expansion joint according to claim 1, wherein said first end of said tube has an outwardly facing surface with a circumferential groove therein.

3. The expansion joint according to claim 1, wherein:
    said coupling has a plurality of arcuate segments joined end to end surrounding said tube, each of said segments having first and second radially inwardly projecting keys positioned in spaced apart relation;
    said ring has an outwardly facing surface with a circumferential groove therein;
    said sleeve has an outwardly facing surface positioned at said first end thereof with a circumferential groove therein, said first key engaging said circumferential groove in said ring, said second key engaging said circumferential groove in said sleeve.

4. The expansion joint according to claim 1, wherein said sleeve has an outwardly facing surface positioned at said second end thereof with a circumferential groove therein.

5. The expansion joint according to claim 1, wherein said seal comprises-a sealing element positioned within said at least one groove.

6. The expansion joint according to claim 5, wherein said sealing element comprises an O-ring.

7. The expansion joint according to claim 1, further comprising an anti-extrusion ring positioned within said at least one groove.

8. The expansion joint according to claim 7, wherein said anti-extrusion ring is formed of an elastomer.

9. The expansion joint according to claim 1, wherein said seal comprises:
    a plurality of inwardly facing circumferential grooves positioned in the inner surface of said ring;
    a plurality of sealing elements, each positioned within a respective one of said grooves.

10. The expansion joint according to claim 9, wherein said sealing elements comprise O-rings.

11. The expansion joint according to claim 9, further comprising a plurality of anti-extrusion rings, each positioned within a respective one of said grooves.

12. The expansion joint according to claim 11, wherein said anti-extrusion rings are formed of an elastomer.

13. The expansion joint according to claim 1, further comprising:
   at least one inwardly facing circumferential groove positioned in the inner surface of said ring;
   at least one wiper element positioned within said at least one groove.

14. The expansion joint according to claim 1, wherein:
   said shoulder projects radially inwardly from said inner surface of said ring;
   said packing material surrounds said tube and is positioned adjacent to said shoulder between said inner surface of said ring and said outer surface of said tube.

15. The expansion joint according to claim 14, wherein said hoop is axially movable relatively to said ring for compressing said packing material against said shoulder.

16. The expansion joint according to claim 15, further comprising:
   a plurality of adjustable fasteners, each said fastener extending between said hoop and said ring; and
   wherein tightening of said fasteners moves said hoop toward said ring for compressing said packing material.

17. The expansion joint according to claim 16, further comprising a plurality of springs, each one of said springs mounted on one of said fasteners and engaging said hoop for biasing said hoop toward said ring.

18. The expansion joint according to claim 1, wherein said inlet segment has an inner surface having a shape selected from the group consisting of a straight conical taper and an s-shape having an inflection point marking the transition between a concave inner surface portion and a convex inner surface portion.

19. The expansion joint according to claim 1, further comprising a liner positioned within said inlet segment.

20. The expansion joint according to claim 19, wherein said liner comprises a flange extending outwardly from an end thereof, said flange being bolted to an end of said inlet segment for removably attaching said liner thereto.

21. The expansion joint according to claim 19, wherein said liner has an inner surface having a shape selected from the group consisting of a straight conical taper and an s-shape having an inflection point marking the transition between a concave inner surface portion and a convex inner surface portion.

22. The expansion joint according to claim 1, wherein said inlet segment is separate from said first end of said tube and removably attached thereto, said inlet segment having first and second ends oppositely disposed.

23. The expansion joint according to claim 22, further comprising a second coupling positioned between said first end of said tube and one of said ends of said inlet segment, said second coupling removably attaching said inlet segment to said tube.

24. The expansion joint according to claim 23, wherein:
   said second coupling has a plurality of arcuate segments joined end to end surrounding said tube, each of said segments having first and second radially inwardly projecting keys positioned in spaced apart relation;
   said first end of said tube has an outwardly facing surface with a circumferential groove therein;
   said first end of said inlet segment has an outwardly facing surface with a circumferential groove therein, said first key engaging said circumferential groove in said tube, said second key engaging said circumferential groove in said inlet segment.

25. The expansion joint according to claim 1, further comprising:
   a first lug projecting outwardly from said outer surface of said tube;
   a second lug projecting outwardly from an outer surface of said ring;
   a rod attached to one of said lugs and extending though an opening in an other of said lugs, said rod guiding and being an indicator of relative motion between said tube and said ring.

26. The expansion joint according to claim 25, wherein said rod is attached to said first lug.

27. The expansion joint according to claim 25, wherein said rod comprises a projection extending radially outwardly therefrom, said projection being engageable with said second lug to limit relative motion between said tube and said ring.

28. The expansion joint according to claim 25, further comprising an actuator positioned between said first and second lugs, said actuator for applying force to said lugs and moving said ring and said tube relatively to one another.

29. The expansion joint according to claim 28, wherein said actuator comprises a hydraulic actuator.

* * * * *